(12) United States Patent
Wang et al.

(10) Patent No.: US 12,193,024 B2
(45) Date of Patent: Jan. 7, 2025

(54) UPLINK TRANSMISSIONS BASED ON SIDELINK GRANTS

(71) Applicant: QUALCOMM Incorporated, San Diego, CA (US)

(72) Inventors: Xiaojie Wang, Hillsborough, NJ (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 17/687,891

(22) Filed: Mar. 7, 2022

(65) Prior Publication Data

US 2023/0284232 A1    Sep. 7, 2023

(51) Int. Cl.
| | |
|---|---|
| *H04W 72/00* | (2023.01) |
| *H04W 72/02* | (2009.01) |
| *H04W 72/0446* | (2023.01) |
| *H04W 72/21* | (2023.01) |
| *H04W 72/23* | (2023.01) |

(52) U.S. Cl.
CPC ........... *H04W 72/23* (2023.01); *H04W 72/02* (2013.01); *H04W 72/0446* (2013.01); *H04W 72/21* (2023.01)

(58) Field of Classification Search
USPC ........................................................ 370/329
See application file for complete search history.

(56) References Cited

U.S. PATENT DOCUMENTS

| | | | | |
|---|---|---|---|---|
| 2019/0306835 A1* | 10/2019 | Hoang | .................. | H04W 72/53 |
| 2021/0274543 A1* | 9/2021 | Ryu | ..................... | H04W 72/569 |
| 2023/0164803 A1* | 5/2023 | Ko | ........................ | H04L 1/1864 370/329 |
| 2023/0354407 A1* | 11/2023 | Ganesan | ............... | H04W 72/02 |
| 2024/0137932 A1* | 4/2024 | Zhang | ............... | H04W 72/1268 |

OTHER PUBLICATIONS

International Search Report and Written Opinion—PCT/US2023/012142—ISA/EPO—Jun. 13, 2022 (2201190WO).

* cited by examiner

*Primary Examiner* — Brandon M Renner
(74) *Attorney, Agent, or Firm* — Holland & Hart LLP

(57) ABSTRACT

Methods, systems, and devices for wireless communications are described. A user equipment (UE) may receive an uplink grant indicating uplink resources on which to transmit uplink signaling. The UE may receive a sidelink grant indicating sidelink resources on which to transmit sidelink signaling. The UE may determine whether a priority level of the uplink signaling, a priority level of the sidelink signaling, or a combination thereof, satisfies a priority threshold value. The UE may transmit an uplink message using the sidelink resources based on the priority level of the uplink signaling.

28 Claims, 18 Drawing Sheets

UPLINK TRANSMISSIONS BASED ON SIDELINK GRANTS

TECHNICAL FIELD

The following relates to wireless communications, including uplink transmissions based on sidelink grants.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support uplink transmissions based on sidelink grants. Generally, the described techniques provide for using sidelink grants for uplink transmissions. For example, a user equipment (UE) may generate high priority uplink traffic. The UE may determine whether a priority level for the uplink traffic, a priority level for the sidelink traffic, or a combination thereof, satisfy a priority threshold value. For example, the UE may determine whether a priority level of the uplink traffic satisfies (e.g., exceeds) the priority threshold value (e.g., an uplink traffic priority threshold). In some examples, the UE may determine whether a difference between the uplink traffic and the sidelink traffic satisfies the priority threshold value (e.g., a pairwise priority threshold value). In either case, the UE may transmit uplink traffic using the sidelink resources if the priority level(s) satisfy the threshold. In some examples, the UE may transmit the uplink traffic via a specific subset of the sidelink resources. The subset of sidelink resources may overlap with or be a subset of monitoring occasions during which the network entity monitors sidelink resources for uplink traffic. In some examples, the UE may transmit uplink control information (UCI) associated with the uplink traffic on a portion of the sidelink resources (e.g., as part of an uplink transmission using the sidelink resources). A subset of the sidelink resources designated for the UCI may be fixed (e.g., a pre-determined subset of selected sidelink resources), or may be configured by the network entity (e.g., semi-statically). The network entity may configure the UE with uplink control resources for transmitting sidelink feedback information (e.g., associated with the sidelink grant). In some examples, the UE may transmit a sidelink feedback message (e.g., a negative acknowledgment (NACK) message indicating that sidelink transmissions were not successfully completed), or a specialized feedback message (e.g., a sidelink dropped indication) indicating that sidelink resources were dropped (e.g., used for uplink traffic).

A method for wireless communications at a UE is described. The method may include receiving an uplink grant indicating uplink resources on which to transmit uplink signaling, receiving a sidelink grant indicating sidelink resources on which to transmit sidelink signaling, and transmitting an uplink message via the sidelink resources.

An apparatus for wireless communications at a UE is described. The apparatus may include a processor, memory coupled with the processor, and instructions stored in the memory. The instructions may be executable by the processor to cause the apparatus to receive an uplink grant indicating uplink resources on which to transmit uplink signaling, receive a sidelink grant indicating sidelink resources on which to transmit sidelink signaling, and transmit an uplink message via the sidelink resources.

Another apparatus for wireless communications at a UE is described. The apparatus may include means for receiving an uplink grant indicating uplink resources on which to transmit uplink signaling, means for receiving a sidelink grant indicating sidelink resources on which to transmit sidelink signaling, and means for transmitting an uplink message via the sidelink resources.

A non-transitory computer-readable medium storing code for wireless communications at a UE is described. The code may include instructions executable by a processor to receive an uplink grant indicating uplink resources on which to transmit uplink signaling, receive a sidelink grant indicating sidelink resources on which to transmit sidelink signaling, and transmit an uplink message via the sidelink resources.

Some examples of the method, apparatuses, and non-transitory computer-readable medium described herein may further include operations, features, means, or instructions for receiving control signaling indicating a priority threshold value associated with a preemption of sidelink resources for uplink communications, where transmitting the uplink message may be based on a first priority level associated with the uplink message.

Some examples of the method, apparatuses, and non-transitory computer-readable medium described herein may further include operations, features, means, or instructions for comparing the first priority level with a second priority level associated with a pending sidelink message, where the priority threshold value includes a priority difference threshold value associated with the first priority level and the second priority level, and where transmitting the uplink message via the sidelink resources may be based on a difference between the first priority level and the second priority level satisfying the priority threshold value.

Some examples of the method, apparatuses, and non-transitory computer-readable medium described herein may further include operations, features, means, or instructions for determining that the first priority level satisfies the priority threshold value, where the priority threshold value may be associated with the first priority level, and where transmitting the uplink message via the sidelink resources may be based on the first priority level satisfying the priority threshold value.

Some examples of the method, apparatuses, and non-transitory computer-readable medium described herein may further include operations, features, means, or instructions for receiving control signaling indicating a second priority threshold value associated with retransmission of a sidelink message and determining that a retransmission message associated with the sidelink resources fails to satisfy the second priority threshold value or that the sidelink message associated with the sidelink resources may be not a retransmission message, where transmitting the uplink message via the sidelink resources may be based on the determining.

Some examples of the method, apparatuses, and non-transitory computer-readable medium described herein may further include operations, features, means, or instructions for receiving control signaling indicating a subset of the sidelink resources that may be available for transmitting the uplink message and selecting the subset of sidelink resources from the sidelink resources, where transmitting the uplink message includes transmitting the uplink message via the subset of sidelink resources.

In some examples of the method, apparatuses, and non-transitory computer-readable medium described herein, transmitting the uplink message via the sidelink resources may include operations, features, means, or instructions for transmitting, in a subset of the sidelink resources, UCI including a set of multiple parameters associated with the uplink message, where transmitting the uplink message may be based on the UCI.

In some examples of the method, apparatuses, and non-transitory computer-readable medium described herein, the set of multiple parameters includes a modulation and coding scheme, a demodulation reference signal, a hybrid automatic request process number, a time domain resource allocation associated with the sidelink resources, a frequency resource allocation associated with the sidelink resources, a number of layers, a pre-coder, a new data indicator, a redundancy version identifier, or any combination thereof.

Some examples of the method, apparatuses, and non-transitory computer-readable medium described herein may further include operations, features, means, or instructions for receiving control signaling indicating one or more of the set of multiple parameters, where transmitting the UCI may be based on control signaling indicating the one or more of the set of multiple parameters.

Some examples of the method, apparatuses, and non-transitory computer-readable medium described herein may further include operations, features, means, or instructions for receiving an indication of the subset of the sidelink resources.

In some examples of the method, apparatuses, and non-transitory computer-readable medium described herein, the subset of sidelink resources may be associated with a fixed position within the sidelink resources.

Some examples of the method, apparatuses, and non-transitory computer-readable medium described herein may further include operations, features, means, or instructions for dropping a pending sidelink message based on transmitting the uplink message via the sidelink resources and transmitting a feedback message indicating that the UE used the sidelink resources for transmitting the uplink message.

In some examples of the method, apparatuses, and non-transitory computer-readable medium described herein, the feedback message includes a NACK message or an indication that the pending sidelink message may have been dropped.

A method for wireless communications at a network entity is described. The method may include outputting an uplink grant for a UE indicating uplink resources on which the UE is to transmit uplink signaling, outputting a sidelink grant for the UE indicating sidelink resources on which the UE is to transmit sidelink signaling, and obtaining an uplink message via the sidelink resources.

An apparatus for wireless communications at a network entity is described. The apparatus may include a processor, memory coupled with the processor, and instructions stored in the memory. The instructions may be executable by the processor to cause the apparatus to output an uplink grant for a UE indicating uplink resources on which the UE is to transmit uplink signaling, output a sidelink grant for the UE indicating sidelink resources on which the UE is to transmit sidelink signaling, and obtain an uplink message via the sidelink resources.

Another apparatus for wireless communications at a network entity is described. The apparatus may include means for outputting an uplink grant for a UE indicating uplink resources on which the UE is to transmit uplink signaling, means for outputting a sidelink grant for the UE indicating sidelink resources on which the UE is to transmit sidelink signaling, and means for obtaining an uplink message via the sidelink resources.

A non-transitory computer-readable medium storing code for wireless communications at a network entity is described. The code may include instructions executable by a processor to output an uplink grant for a UE indicating uplink resources on which the UE is to transmit uplink signaling, output a sidelink grant for the UE indicating sidelink resources on which the UE is to transmit sidelink signaling, and obtain an uplink message via the sidelink resources.

Some examples of the method, apparatuses, and non-transitory computer-readable medium described herein may further include operations, features, means, or instructions for outputting control signaling indicating a priority threshold value associated with a preemption of sidelink resources for uplink communications, where obtaining the uplink message may be based on a first priority level associated with the uplink message.

In some examples of the method, apparatuses, and non-transitory computer-readable medium described herein, the priority threshold value includes a priority difference threshold value associated with the first priority level and a second priority level associated with a pending sidelink signaling.

In some examples of the method, apparatuses, and non-transitory computer-readable medium described herein, the priority threshold value may be associated with the first priority level.

Some examples of the method, apparatuses, and non-transitory computer-readable medium described herein may further include operations, features, means, or instructions for outputting control signaling indicating a subset of the sidelink resources that may be available for transmitting the uplink message and monitoring the subset of the sidelink resources for the uplink message, where obtaining the uplink message via the sidelink resources may be based on the monitoring.

In some examples of the method, apparatuses, and non-transitory computer-readable medium described herein, the subset of the sidelink resources includes a subset of one or more monitoring occasions for obtaining uplink signaling via the sidelink resources.

In some examples of the method, apparatuses, and non-transitory computer-readable medium described herein, the subset of the sidelink resources partially overlaps with one or more monitoring occasions for obtaining uplink signaling via the sidelink resources.

Some examples of the method, apparatuses, and non-transitory computer-readable medium described herein may further include operations, features, means, or instructions for outputting control signaling indicating a third priority level associated with retransmission of a sidelink message.

Some examples of the method, apparatuses, and non-transitory computer-readable medium described herein may further include operations, features, means, or instructions for obtaining, in a subset of the sidelink resources, UCI including a set of multiple parameters associated with the uplink message, where obtaining the uplink message may be based on the UCI.

In some examples of the method, apparatuses, and non-transitory computer-readable medium described herein, the set of multiple parameters includes a modulation and coding scheme, a demodulation reference signal, a hybrid automatic request process number, a time domain resource allocation associated with the sidelink resources, a frequency resource allocation associated with the sidelink resources, a number of layers, a pre-coder, a new data indicator, a redundancy version identifier, or any combination thereof.

Some examples of the method, apparatuses, and non-transitory computer-readable medium described herein may further include operations, features, means, or instructions for outputting control signaling indicating one or more of the set of multiple parameters, where obtaining the UCI may be based on the control signaling indicating the one or more of the set of multiple parameters.

Some examples of the method, apparatuses, and non-transitory computer-readable medium described herein may further include operations, features, means, or instructions for outputting control signaling indicating the subset of the sidelink resources, where obtaining the UCI may be based on outputting the control signaling indicating the subset of the sidelink resources.

In some examples of the method, apparatuses, and non-transitory computer-readable medium described herein, the subset of sidelink resources may be associated with a fixed position within the sidelink resources.

Some examples of the method, apparatuses, and non-transitory computer-readable medium described herein may further include operations, features, means, or instructions for obtaining a feedback message indicating that the UE used the sidelink resources for transmitting the uplink message.

In some examples of the method, apparatuses, and non-transitory computer-readable medium described herein, the feedback message includes a NACK message or an indication that a sidelink message may have been dropped by the UE.

DETAILED DESCRIPTION

Figure 1:
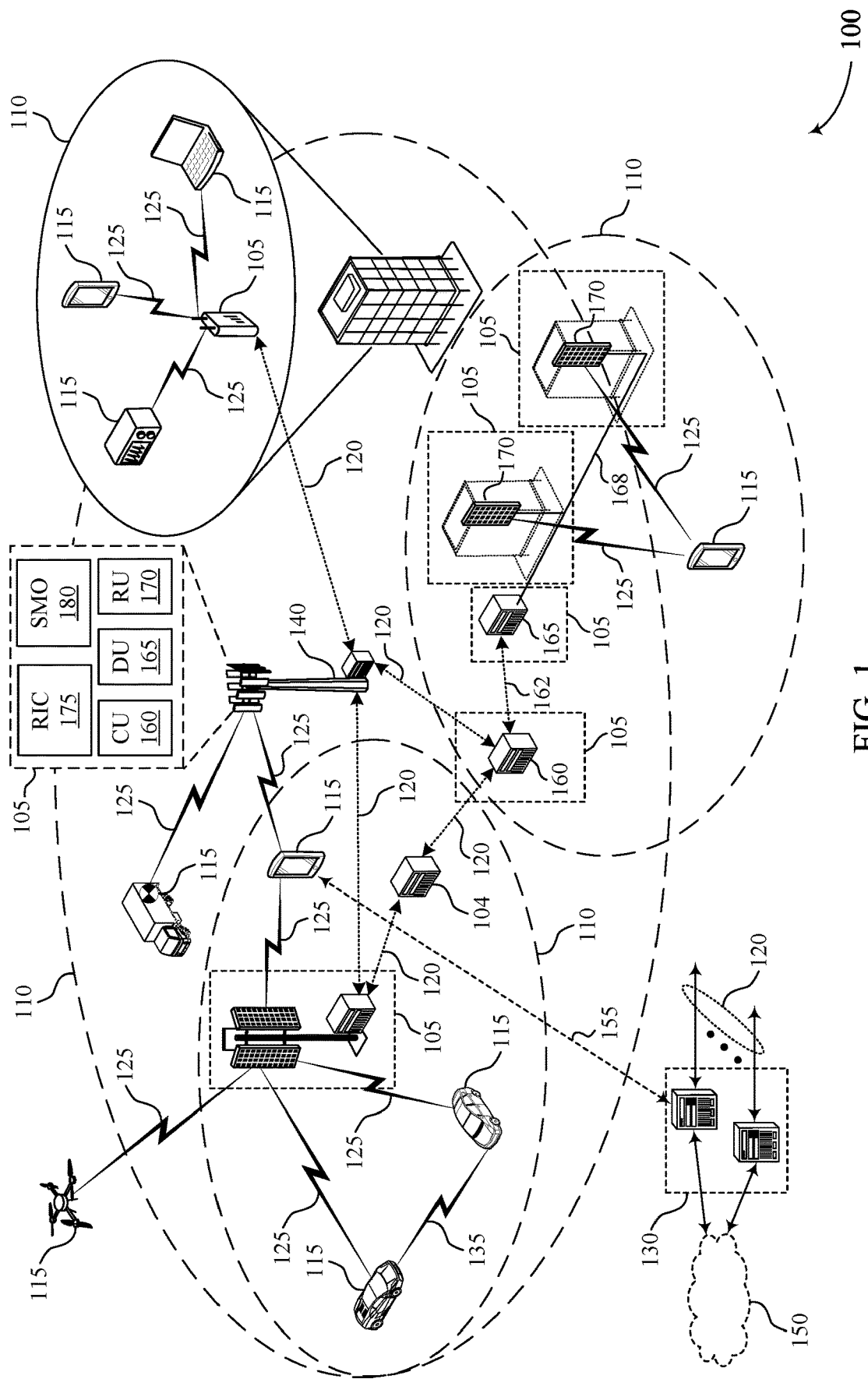
FIGS. 1 and 2 illustrate examples of wireless communications systems that support uplink transmissions based on sidelink grants in accordance with one or more aspects of the present disclosure.

In some wireless communications a user equipment (UE) may support uplink communications and sidelink communications. A network entity may schedule the UE with the uplink communications and the sidelink communications using separate grants. The UE may maintain a sidelink buffer and an uplink buffer, and may report separate resource buffer reports (e.g., buffer status reports (BSRs)) to the network entity (e.g., a sidelink BSR for the sidelink buffer and an uplink BSR for the uplink buffer). In some cases, the uplink communication may be uplink traffic with a high priority (e.g., ultra-reliable low-latency communication (URLLC)). If the UE generates high priority uplink traffic, transmits an uplink BSR, and waits for a corresponding uplink grant, the UE may not be able to transmit the high priority uplink traffic fast enough to satisfy URLLC conditions, or may experience latency in transmitting high priority uplink traffic. Because of the delay in transmitting the high priority uplink traffic, the UE may experience increased latency for uplink traffic (e.g., high priority uplink traffic), inefficient utilization of scheduled resources, reduced reliability of uplink signaling and URLLC signaling, and a lack of flexibility for different types of communications, among other drawbacks.

The techniques described herein support using sidelink grants for uplink transmissions. In some examples, a network entity may provide a UE with an uplink grant for uplink traffic and a sidelink grant for sidelink traffic, and the UE may transmit the uplink traffic (e.g., high priority uplink traffic) using sidelink resources indicated in the sidelink grant. For example, a network entity may provide the UE with a priority threshold value. In some examples, the UE may determine whether a priority level of the uplink traffic satisfies (e.g., exceeds) the priority threshold value (e.g., an uplink traffic priority threshold). In some examples, the UE may determine whether a difference between the uplink traffic and the sidelink traffic satisfies the priority threshold value (e.g., a pairwise priority threshold value). In either case, the UE may transmit uplink traffic using the sidelink resources if the priority level(s) satisfy the threshold. In some examples, the UE may transmit the uplink traffic via a specific subset of the sidelink resources. The subset of sidelink resources may overlap with or be a subset of monitoring occasions during which the network entity monitors sidelink resources. In some examples, the UE may transmit uplink control information (UCI) associated with the uplink traffic in a portion of the sidelink resources. A subset of the sidelink resources designed for the UCI may be fixed (e.g., a pre-determined subset of selected sidelink resources), or may be configured by the network entity. In some examples, the UE may transmit a feedback message (e.g., a negative acknowledgment (NACK) message), or a specialized feedback message indicating that sidelink resources were dropped (e.g., used for uplink traffic).

Aspects of the disclosure are initially described in the context of wireless communications systems. Aspects of the disclosure are then described with respect to configurations, a wireless communications system, and a process flow. Aspects of the disclosure are further illustrated by and described with reference to apparatus diagrams, system diagrams, and flowcharts that relate to uplink transmissions based on sidelink grants.

FIG. 1 illustrates an example of a wireless communications system 100 that supports uplink transmissions based on sidelink grants in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support uplink transmissions based on sidelink grants as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support URLLC. The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some examples, sidelink communications may operate according to different modes. For example, the sidelink communications may operate according to a sidelink Mode 1 or a sidelink Mode 2. The sidelink Mode 1 transmission may indicate that the network entities 105 may reserve time and frequency resources for the UEs 115 to use for sidelink communications, among other procedures. The sidelink Mode 2 may indicate that the UEs 115 may reserve time and frequency resources for sidelink communications, among other rules. According to the sidelink Mode 1 procedure, the network entity 105 may transmit a control message (for example, RRC or DCI) to a first UE 115 for sidelink communications between the first UE 115 and a second UE 115. In some cases, the control message (for example, a DCI 3_0 format message) may include: a resource pool (RP) index (for example, bits depending on a number of RPs in a higher layer parameter, such as sl-TxPoolScheduling); a time gap (for example, three bits indicated by a parameter such as sl-DCI-ToSL-Trans); a HARQ process number (HPN) (for example, four bits); a new data indicator (NDI) (for example, one bit); a subcarrier index (for example, a minimum subcarrier index); sidelink control information (SCI) format fields, including time domain resource allocation (TDRA), frequency domain resource allocation (FDRA), or both; a physical sidelink feedback channel (PSFCH) to HARQ feedback timing (for example, by sl-PSFCH-ToPUCCH); a physical uplink control channel (PUCCH) resource indicator (for example, three bits); a configuration index (zero bits in examples in which only dynamic grant based monitoring, three bits otherwise); a sidelink assignment indicator (SAI) (two bits); and padding bits.

In some cases, the wireless communications system 100 may support grant based communications. For example, the network entity 105 may transmit, to the UE 115, control signaling (e.g., DCI or RRC) including an uplink grant, via a physical downlink control channel (PDCCH), to schedule resources for uplink transmissions. The UE 115 may transmit the uplink transmissions, using the scheduled resources, over a physical uplink shared channel (PUSCH). In some cases, the uplink transmissions may be associated with an HPN that may allow the network entity 105 to schedule retransmissions of the uplink transmissions upon a failure (e.g., if the network entity 105 fails to decode the uplink transmissions).

In some examples, a network entity 105 may schedule multiple communications for a UE 115 that supports uplink communications and sidelink communications. The network entity 105 may schedule the UE 115 with the uplink communications and the sidelink communications using separate grants. In some cases, the separate grants may use different control signaling (e.g., DCI or RRC messages) or different formats (e.g., a first DCI format and a second different DCI format). The UE 115 may maintain a sidelink buffer and an uplink buffer, and may report separate resource buffer reports (e.g., BSR) to the network entity 105 per buffer. In some cases, the uplink communication may be uplink traffic with a high priority (e.g., URLLC). If the UE 115 generates high priority uplink traffic, transmits an uplink BSR, requests resources, and waits for a corresponding uplink grant (e.g., a scheduling DCI), the UE 115 may not be able to satisfy URLLC constraints, or may experience latency in transmitting high priority uplink traffic. Because of the delay in transmitting the high priority uplink traffic, the UE 115 may experience increased latency for uplink traffic with high priority, inefficient utilization of scheduled resources, and a lack of flexibility for different types of communications, among other drawbacks. In some cases, wireless communication systems may not support uplink transmissions on sidelink resources, even if uplink transmissions on available sidelink resources would satisfy latency constraints or reduce latency.

The techniques described herein support using sidelink grants for uplink transmissions. In some examples, a network entity 105 may provide a UE 115 with an uplink grant for uplink traffic and a sidelink grant for sidelink traffic, and the UE 115 may transmit the uplink traffic (e.g., high priority uplink traffic) using sidelink resources indicated in the sidelink grant. For example, the network entity 105 may provide the UE 115 with a priority threshold value. In some examples, the UE 115 may determine whether a priority level of the uplink traffic satisfies (e.g., exceeds) the priority threshold value (e.g., an uplink traffic priority threshold). In some examples, the UE 115 may determine whether a difference between the uplink traffic and the sidelink traffic satisfies the priority threshold value (e.g., a pairwise priority threshold value). In either case, the UE 115 may transmit uplink traffic using the sidelink resources if the priority level(s) satisfy the threshold. In some examples, the UE 115 may transmit the uplink traffic via a specific subset of the sidelink resources. The subset of sidelink resources may overlap with or be a subset of monitoring occasions during which the network entity 105 monitors sidelink resources. In some examples, the UE 115 may transmit UCI associated with the uplink traffic in a portion of the sidelink resources. A subset of the sidelink resources designed for the UCI may be fixed (e.g., a pre-determined subset of selected sidelink resources), or may be configured by the network entity 105. In some examples, the UE 115 may transmit a feedback message (e.g., a NACK message), or a specialized feedback message indicating that sidelink resources were dropped (e.g., used for uplink traffic).

Figure 2:
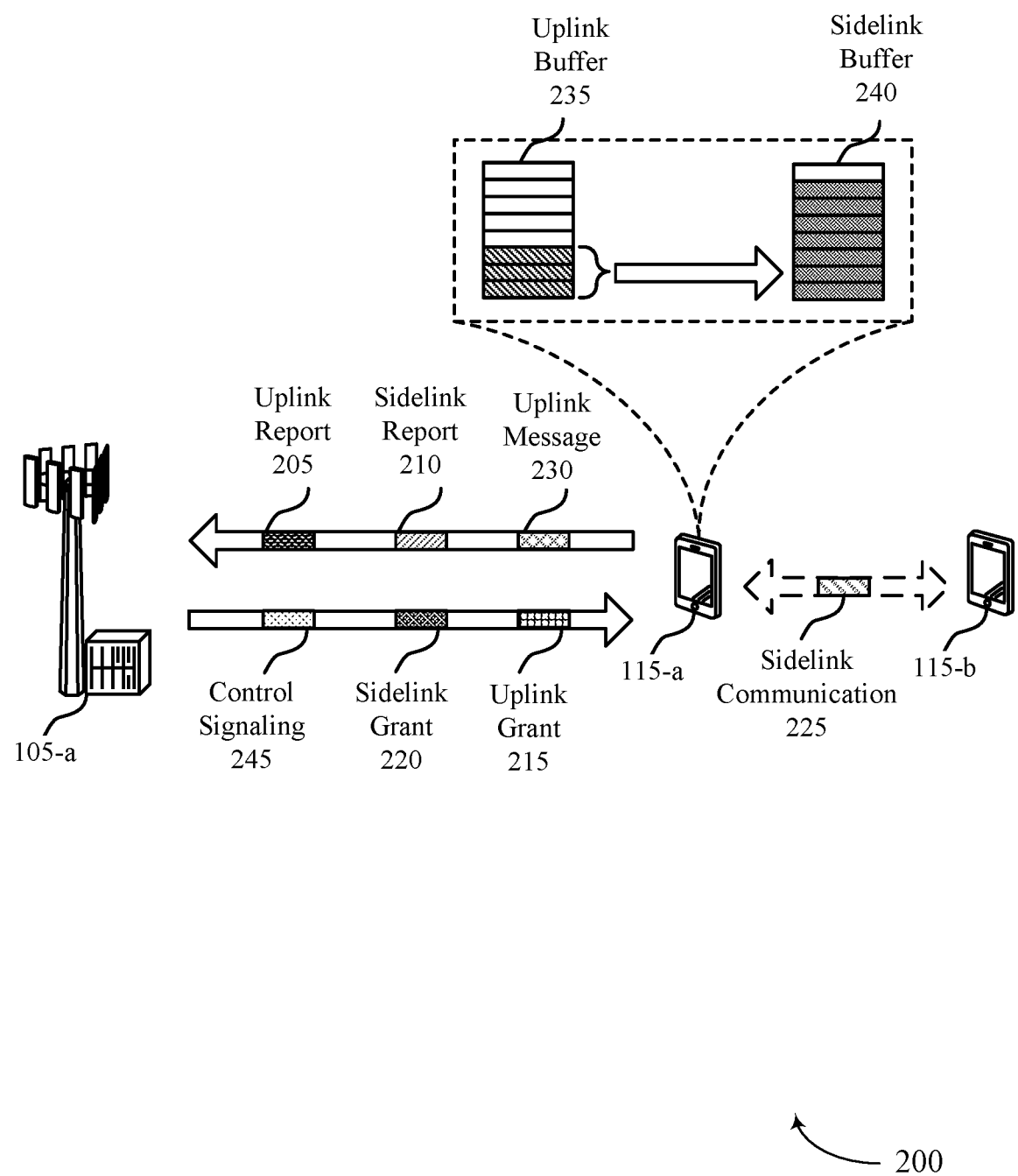

FIG. 2 illustrates an example of a wireless communications system 200 that supports uplink transmissions based on sidelink grants in accordance with one or more aspects of the present disclosure. In some examples, the wireless communications system 200 may implement aspects of the wireless communications system 100. The wireless communications system 200 may include multiple UEs 115 including a UE 115-a and a UE 115-b and a network entity 105-a, which may be examples of a UE 115 and a network entity 105 respectively, as described herein with reference to FIG. 1. The network entity 105-a may be in wireless communication with the UE 115-a, the UE 115-b, or both. In some cases, the UE 115-a may support both uplink and sidelink communications.

In some examples, the network entity 105-a may schedule both sidelink and uplink communications for the UE 115-a. The network entity 105-a may transmit the uplink grant 215 to the UE 115-a, indicating uplink resources on which the UE 115-a may transmit the uplink communications. The network entity 105-a may also transmit the sidelink grant 220 to the UE 115-a, indicating sidelink resources on which the UE 115-a may transmit the sidelink communications (e.g., sidelink communication 225. The UE 115-a may maintain both a sidelink buffer 240 for pending sidelink traffic and an uplink buffer 235 for pending uplink traffic. The UE 115-a may transmit separate resource buffer reports. For example, the UE 115-a may transmit uplink report 205 (e.g., an uplink BSR for the uplink buffer 235) and may also transmit sidelink report 210 (e.g., a sidelink BSR for the sidelink buffer 240). In some examples, the network entity 105-a may allocate resources (e.g., via the sidelink grant 220, the uplink grant 215, or both) to the UE 115-a based on the uplink report 205 and the sidelink report 210.

In some cases, the UE 115-a may generate uplink data, which may include the uplink message 230. The uplink message 230 may be uplink traffic with a high priority (e.g., URLLC, among other examples). If the UE 115-a generates high priority uplink traffic, transmits the uplink report 205, requests uplink resources, and waits for a corresponding uplink grant 215, the UE 115-a may not be able to satisfy URLLC requirements, or may experience latency in transmitting the high priority uplink message 230. In some cases, the UE 115-a may transmit the uplink message 230 using sidelink resources (e.g., scheduled by the sidelink grant 220). For example, sidelink resources scheduled by the sidelink grant 220 may occur earlier in time than available uplink resources scheduled by the uplink grant 215. In some examples, scheduled uplink resources may already be utilized by other uplink traffic, and may not be available for the uplink message 230. In such examples, the UE 115-a may be able to satisfy URLLC timing constraints, or reduce uplink signaling latency, or the like, by transmitting the uplink message 230 using the sidelink resources (e.g., instead of using the sidelink resources for transmitting sidelink communications 225).

In some examples, the network entity 105-a may configure the UE 115-a with one or more conditions under which the UE 115-a may be allowed to use the sidelink resources for the uplink message 230. For example, as described herein with reference to FIG. 3, the UE 115-a may transmit uplink traffic using sidelink resources based on whether granted sidelink resources satisfy one or more conditions. In some examples, as described herein with reference to FIG. 2, the UE 115-a may transmit uplink traffic using sidelink resources based on whether priority levels associated with the uplink traffic, the sidelink traffic, or a combination thereof, satisfy one or more conditions (e.g., satisfy a threshold priority level). In some examples, the network entity 105-a may configure the one or more conditions under which such operations (e.g., transmitting uplink traffic using sidelink resources) may be allowed.

In some examples, the UE 115-a may determine a priority threshold value associated with a preemption of sidelink resources for uplink communications. For example, the UE 115-a may transmit uplink traffic using sidelink resources if a priority level associated with the uplink traffic is higher than a threshold (e.g., an uplink priority threshold). In some cases, the network entity 105-a may configure the UE 115-a with the priority threshold value via control signaling 245 (e.g., a DCI, an RRC, a MAC-CE, or other control message), the priority threshold value may be preconfigured (e.g., as part of a standard) at the UE 115-a, or both. The UE 115-a may compare the priority threshold value with the priority level of the uplink message 230, to determine which value is greater. For example, the priority level of the uplink message 230 may be represented by ULprior and the priority threshold value may be represented by Prior_thres. If the priority level of the uplink message 230 is less than the priority threshold value (e.g., ULprior<Prior_thres), then uplink information for the uplink message 230 in uplink buffer 235 may preempt the sidelink information for the sidelink communication 225 in the sidelink buffer 240 and the UE 115-a may transmit the uplink message 230 using sidelink resources. In some cases, the uplink message 230 may use only a portion of the sidelink resources scheduled for the sidelink communication 225. In such cases, the UE 115-a may communicate the sidelink communication 225 with the UE 115-b using other portions of the sidelink resources scheduled for the sidelink communication 225, as described herein with reference to FIG. 3. In some examples, a lower priority value may represent a higher priority. Thus, if ULprior<Prior_thres, then the UE 115-a may determine that the priority level associated with the uplink message 230 is higher than the priority threshold value.

Additionally, or alternatively, the UE 115-a may transmit uplink traffic using sidelink resources if a pairwise priority (e.g., the priority level of the uplink traffic and the priority level of the sidelink traffic) satisfies a priority threshold value. For example, the UE 115-a may be configured (e.g., via the control signaling 245 such as a DCI message, an RRC message, a MAC-CE, or any combination thereof), preconfigured, or both, with a priority threshold value per priority pair. The priority threshold value may be preconfigured (e.g., as part of a standard) at the UE 115-a. The priority level of the uplink message 230 may be represented by ULprior, the priority level of the sidelink communication 225 may be represented by SLprior, and the priority threshold value may be represented by threshold (SLprior, ULprior). If a difference between the priority level of the sidelink communication 225 and the priority level of the uplink message 230 is greater than the priority threshold value (e.g., if SLprior−ULprior<threshold (SLprior, ULprior)), then the UE 115-a may transmit the uplink message 230 using the sidelink resources.

In both examples, (e.g., ULprior<Prior$_{thres}$ and SLprior−ULprior<threshold (SLprior, ULprior)) a lower priority value may indicate a higher priority (e.g., a priority value of one indicates a higher priority than a priority value of two), however, other priority configurations may be possible. For example, a higher priority value may indicate a higher priority level, in which case the UE 115-a may transmit the uplink traffic using the sidelink resources if SLprior−ULprior>threshold (SLprior, ULprior) or if ULprior>Prior$_{thres}$.

Additionally, or alternatively, the UE 115-a may be configured (e.g., via control signaling 245 such as a DCI message, an RRC message, a MAC-CE, or any combination thereof), preconfigured, or both, with a priority threshold value associated with a retransmission of a packet (e.g., the packet associated with the sidelink communication 225). The priority threshold value may be preconfigured (e.g., as part of a standard) at the UE 115-a, or both. In some examples, the one or more conditions may indicate that, for a sidelink grant 220 for re-transmission of a sidelink packet with a priority level that exceeds the priority threshold value may not be pre-empted by uplink traffic. In some examples, the UE 115-a may prepare to send a retransmission of the sidelink communication 225. The UE 115-a may compare the priority level of the retransmission of the sidelink communication 225 with the priority threshold value associated with the retransmission of the sidelink communication 225, and determine to use the sidelink resources for the retransmission of the sidelink communication 225 if the priority level of the retransmission exceeds the priority threshold value. In some cases, the UE 115-a may compare the priority level of the uplink message 230 with the priority threshold value associated with the retransmission of the sidelink communication 225. The UE 115-a may determine to use the sidelink resources for the retransmission of the sidelink communication 225 based on the retransmission priority level, the uplink priority level, or both.

Figure 3:
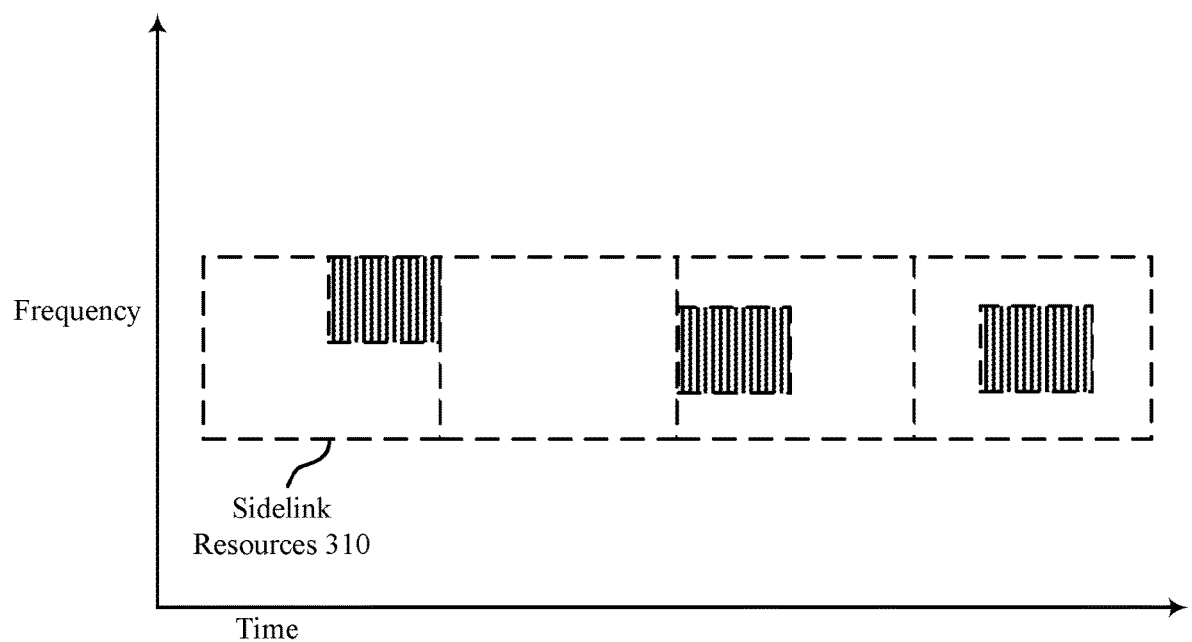
FIGS. 3 and 4 illustrate examples of resource configurations that support uplink transmissions based on sidelink grants in accordance with one or more aspects of the present disclosure.

FIG. 3 illustrates an example of a resource configuration 300 that supports uplink transmissions based on sidelink grants in accordance with one or more aspects of the present disclosure. In some examples, the configuration 300 may represent aspects of the wireless communications system 100 and the wireless communications system 200. The configuration 300 may include one or more monitoring occasions 305 and one or more sidelink resources 310.

As described herein with reference to FIG. 2, in some examples, a network entity 105 may configure a UE 115 with one or more conditions that allow the UE 115 to use the one or more sidelink resources 310 for transmitting an uplink message. In some examples, whether the UE 115-a is permitted to transmit uplink traffic using sidelink resources 310 may be based on the sidelink resources 310 satisfying one or more conditions (e.g., conditions configured via control signaling, preconfigured, included in one or more standards documents, or any combination thereof). For example, for the network entity 105 to successfully obtain and decode the uplink message, the network entity 105 may monitor (e.g., blind decode) the sidelink resources 310 for the uplink message. However, monitoring each sidelink resource 310 may be very costly (e.g., with respect to power, resources, time, among other examples). Thus, the network entity 105 may not always attempt to decode uplink traffic on all sidelink resources 310. Instead, the network entity 105 may attempt to decode only a portion of the sidelink resources 310 for the uplink message. For example, the network entity 105 may configure a subset of the sidelink resources 310 (e.g., time resources, frequency resources, or both) that the network entity 105 intends to monitor for the uplink message (e.g., one or more monitoring occasions 305). In such examples, the UE 115-a may only be allowed to use granted sidelink resources 310 for transmitting uplink traffic if the sidelink resources fall into or overlap with the configured subset. In some examples, the UE 115 may determine which resources of the sidelink resources 310 to use for the uplink message based on the monitoring occasions 305. In some examples, the UE 115 may use multiple resources of the sidelink resources 310 to transmit the uplink message (e.g., up to three resources according to some techniques) or one of the sidelink resources 310 (e.g., the first one). If there are leftover resources of the sidelink resources 310 (e.g., resources unused by the uplink message) the UE 115 may transmit at least a portion of a scheduled sidelink communication.

In some cases, for the UE 115 to use the sidelink resources 310 for transmitting the uplink message, the sidelink resources 310 may be a subset of the monitoring occasions 305, partially overlap with the monitoring occasions 305, or both. For example, the monitoring occasions 305 may include sidelink resources, uplink resources, other resources, or any combination thereof. If the UE 115 is to use the sidelink resources 310 for the uplink message, the sidelink resources must at least partially overlap with the monitoring occasions 305 such that a portion of the sidelink resources 310 are included in the monitoring occasions 305. In some cases, the network entity 105 may configure the monitoring occasions 305 to cover all of the sidelink resources 310 or a portion of the sidelink resources 310 (e.g., a portion of time resources, a portion of frequency resources, among other examples).

Figure 4:
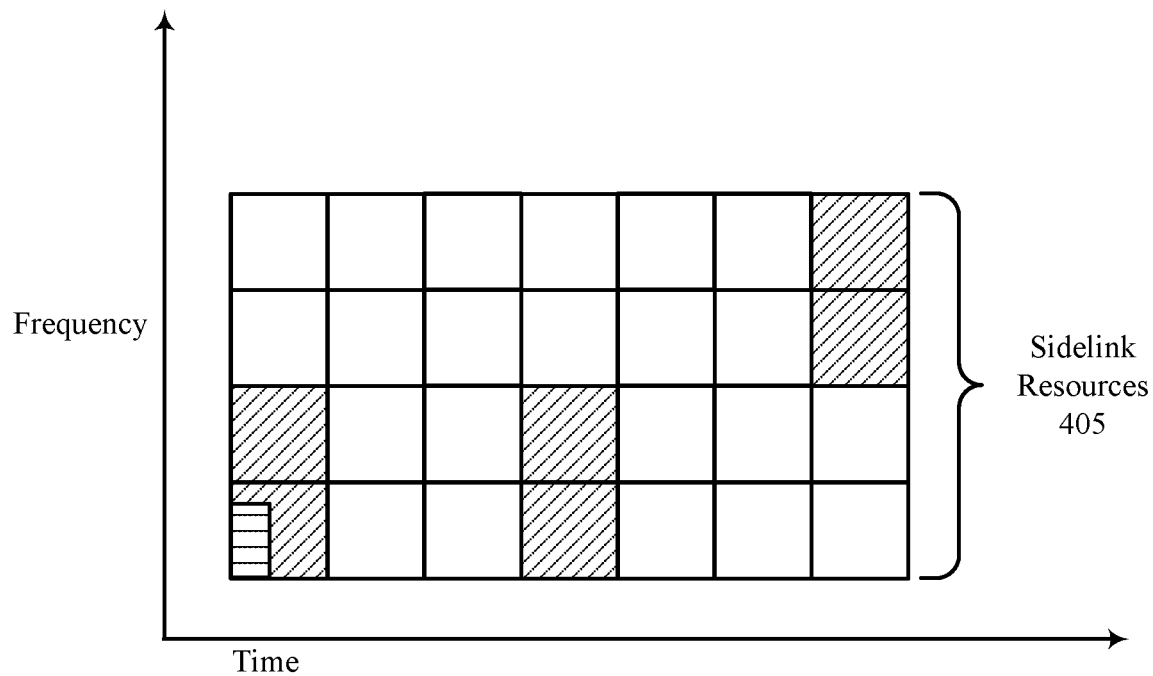

FIG. 4 illustrates an example of a resource configuration 400 that supports uplink transmissions based on sidelink grants in accordance with one or more aspects of the present disclosure. In some examples, the configuration 400 may represent aspects of the wireless communications system 100, the wireless communications system 200, and the configuration 300. The configuration 400 may include one or more sidelink resources 405, one or more scheduled sidelink resources 410, and an uplink message, which may include UCI 415.

In some examples, a network entity 105 may schedule multiple communications for a UE 115 that supports uplink communications and sidelink communications. The network entity 105 may schedule the UE 115 with the uplink communications and the sidelink communications using separate grants. In some cases, the separate grants may use different control signaling (e.g., DCI or RRC messages) or different formats (e.g., a first DCI format and a second different DCI format). As described herein, the UE 115 may transmit uplink traffic via sidelink resources if one or more conditions are satisfied. To receive the uplink traffic, the network entity 105 may monitor (e.g., attempt to blind decode) uplink signals on all scheduled sidelink resources 410. However, this may result in inefficient expenditures of power, increased latency at the network device, inefficient use of computational and system resources, or the like. In some examples, as described in greater detail with reference to FIG. 3, the network entity 105 may communicate (e.g., to the UE 115) monitoring occasions during which the network entity 105 will monitor sidelink resources. However, the network entity 105 may not be able to successfully receive the uplink traffic (e.g., uplink message) during scheduled sidelink resources 410 without UCI 415. UCI 415 may include, for example, uplink transmission parameters (e.g., a modulation and coding scheme (MCS), one or more demodulation reference signal (DMRSs), or the like). UCI 415 may also include an NDI, a TDRA, an FDRA, a number of layers, a pre-coder, a redundancy version identifier (RV-ID), or the like. Additionally, or alternatively, for the network entity 105 to support (e.g., schedule or trigger) retransmissions of the uplink traffic, the uplink traffic may be associated with an HPN parameter of the uplink transmission parameters. The network entity 105 may not be able to support retransmission procedures without identifying an HPN for an uplink message.

In some examples, to support decoding of an uplink message transmitted on scheduled sidelink resources 410, the UE 115 may transmit UCI 415 to the network entity 105 (e.g., may include the UCI 415 in an uplink message transmitted on the scheduled sidelink resources 410). For example, the UE 115 may be scheduled with one or more sidelink resources (e.g., the sidelink grant may grant up to three scheduled sidelink resources 410 within a set of sidelink resources 405). The UE may be allowed to use one sidelink resources (e.g., of the three sidelink resources) or may be allowed to use multiple or all of the granted sidelink resources for transmitting uplink traffic. In some examples, the UE 115 may only be allowed to transmit uplink traffic on one scheduled sidelink resource 410 (e.g., a first scheduled sidelink resource 410), and the UE 115 may transmit sidelink traffic using remaining scheduled sidelink resources 410. Regardless of how many sidelink resources the UE 115 uses for transmitting uplink traffic, the UE 115 may transmit UCI 415 within the PUSCH on which the UE 115 transmits the uplink traffic. In some examples, the UE 115 may transmit, to the network entity 105 via the scheduled sidelink resources 410, one or more UCI parameters, which may include an HPN, an NDI, TDRA, FDRA, MCS, a number of layers, one or more DMRSs, a pre-coder, an RV-ED, etc.

In some examples, one or more of the UCI parameters (e.g., DMRSs, number of layers, among other examples) may be indicated (e.g., configured or preconfigured) by the network entity 105, or included in one or more standards. For example, the network entity 105 may indicate one or more UCI parameters that the UE 115 is to use for transmitting uplink traffic using sidelink resources. In such examples, the UE 115 may not include such fixed (e.g., preconfigured or standardized) UCI parameters in an uplink message. In some examples, the UE 115 may include all UCI parameters in an uplink message regardless of whether the UCI was preconfigured.

UCI may be fixed or semi-statically configured. In some examples, sidelink resources (e.g., within scheduled sidelink resources 410 used for uplink traffic) for UCI may be fixed or semi-statically configured. For instance, if the UCI resources are identified via a fixed configuration, then the UCI 415 may always occupy a pre-defined resource or resources (e.g., a first subchannel and a first two symbols or three symbols of scheduled sidelink resources 410 used for transmitting uplink traffic). If the UCI resources are identified via a semi-static configuration, then the network entity 105 may semi-statically configure a number of resources that can be used for UCI transmission (e.g., through a bet offset for the UCI). For instance, the network entity 105 may indicate a time offset or a frequency offset, or both, from a first sidelink resource of the scheduled sidelink resources 410, or any other resource of the scheduled sidelink resources of the scheduled sidelink resources 410, at which the UE 115 is to transmit the UCI 415 as part of an uplink message transmitted via the sidelink resources. In some examples, an MCS or UCI transmission may be pre-configured (e.g., QPSK plus polar coding, or the like).

Figure 5:
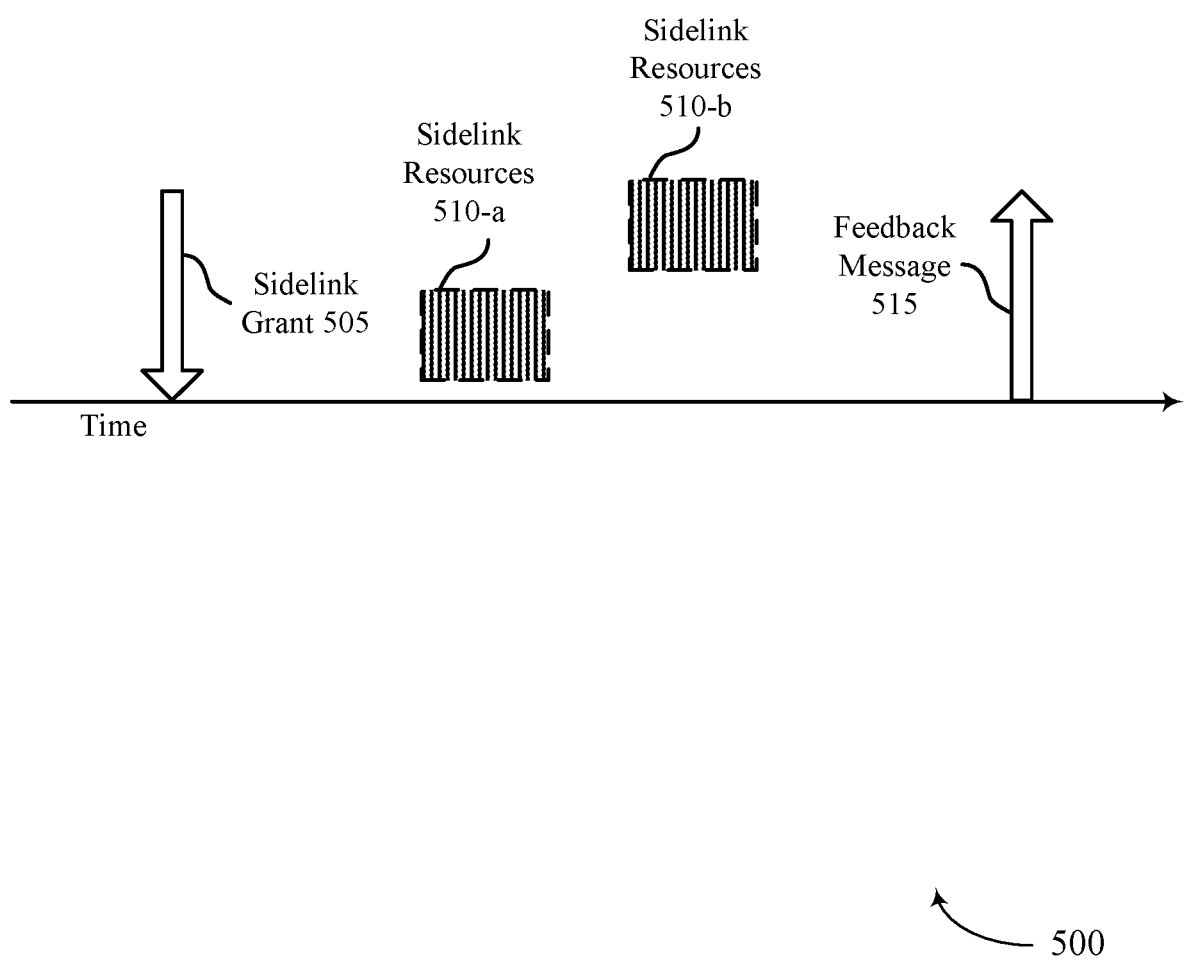
FIG. 5 illustrates an example of a wireless communications system that supports uplink transmissions based on sidelink grants in accordance with one or more aspects of the present disclosure.

FIG. 5 illustrates an example of a wireless communications system 500 that supports uplink transmissions based on sidelink grants in accordance with one or more aspects of the present disclosure. In some examples, the wireless communications system 500 may implement aspects of the wireless communications systems 100 and 200 and the configurations 300 and 400. The wireless communications system 500 may include multiple UEs 115 one or more network entities 105, which may be examples of a UE 115 and a network entity 105 as described herein with reference to FIG. 1.

In some cases, a UE 115 may receive a sidelink grant 505 (e.g., via a PDCCH) scheduling one or more sidelink resources 510 (e.g., sidelink resources 510-*a* and sidelink resources 510-*b*) for a sidelink communication. The sidelink grant 505 may also provide one or more resources (e.g., PUCCH resources) for the UE 115 to transmit sidelink feedback (e.g., feedback message 515) to the network entity 105, indicating whether a sidelink transmission has been successfully completed. The network entity 105 may configure the UE 115 with one or more conditions that allow the UE 115 to use the sidelink grant 505 for an uplink transmission (e.g., as described in greater detail with reference to FIGS. 1-4). In some examples, (e.g., for uplink transmissions), the UE 115 may not use the granted PUCCH resources for the uplink traffic (e.g., the PUCCH feedback to the network entity 105 may not be relevant for uplink traffic).

In some examples, the UE 115 may use a portion (e.g., one) of the sidelink resources 510 (e.g., the sidelink resources 510-*a*) for transmitting uplink traffic, and the other remaining resources 510 (e.g., the sidelink resources 510-*b*) for transmitting the sidelink traffic. In such examples the UE 115 may transmit the feedback message 515 to the network entity 105 to indicate sidelink feedback information (e.g., HARQ ACK or HARQ NACK) to the network entity 105. The sidelink feedback message 515 may include a sidelink ACK or a sidelink NACK, indicating whether sidelink traffic was successfully communicated, or may include a sidelink dropping indication (e.g., SL-dropping) indicating that the sidelink communications on the sidelink resource 510-*a* were dropped for an uplink transmission on the sidelink resources 510-*a*. In some examples, if the UE 115 uses all of the sidelink resources 510 for transmitting uplink traffic, then the UE 115 may not transmit sidelink feedback information (e.g., because no sidelink transmission took place during the sidelink resources 510). Instead, the UE 115 may transmit a feedback message 515 including a NACK message (e.g., indicating that the sidelink transmission was dropped or unsuccessful) or a sidelink dropped message (e.g., indicating in a PUCCH or sidelink HARQ codebook or a combination thereof that the sidelink signaling was dropped during the sidelink resources 510). In such examples, the network entity 105 may determine whether to allocate additional or different sidelink resources 510. For instance, if the network entity 105 receives a NACK in the feedback message 515, then the network entity 105 may determine that channel quality for the sidelink resources 510 are poor (e.g., resulting in failed sidelink transmissions) and may allocate different sidelink resources to the UE 115. However, if the network entity 105 receives a sidelink dropped message in the feedback message 515, then the network entity 105 may determine that the sidelink resources 510 (e.g., the frequency resources of the sidelink resources 510, spatial resources, channel quality, interference levels, among other examples) satisfy a threshold or are still viable for sidelink communications, and may consider such viability in scheduling subsequent sidelink resources 510.

Figure 6:
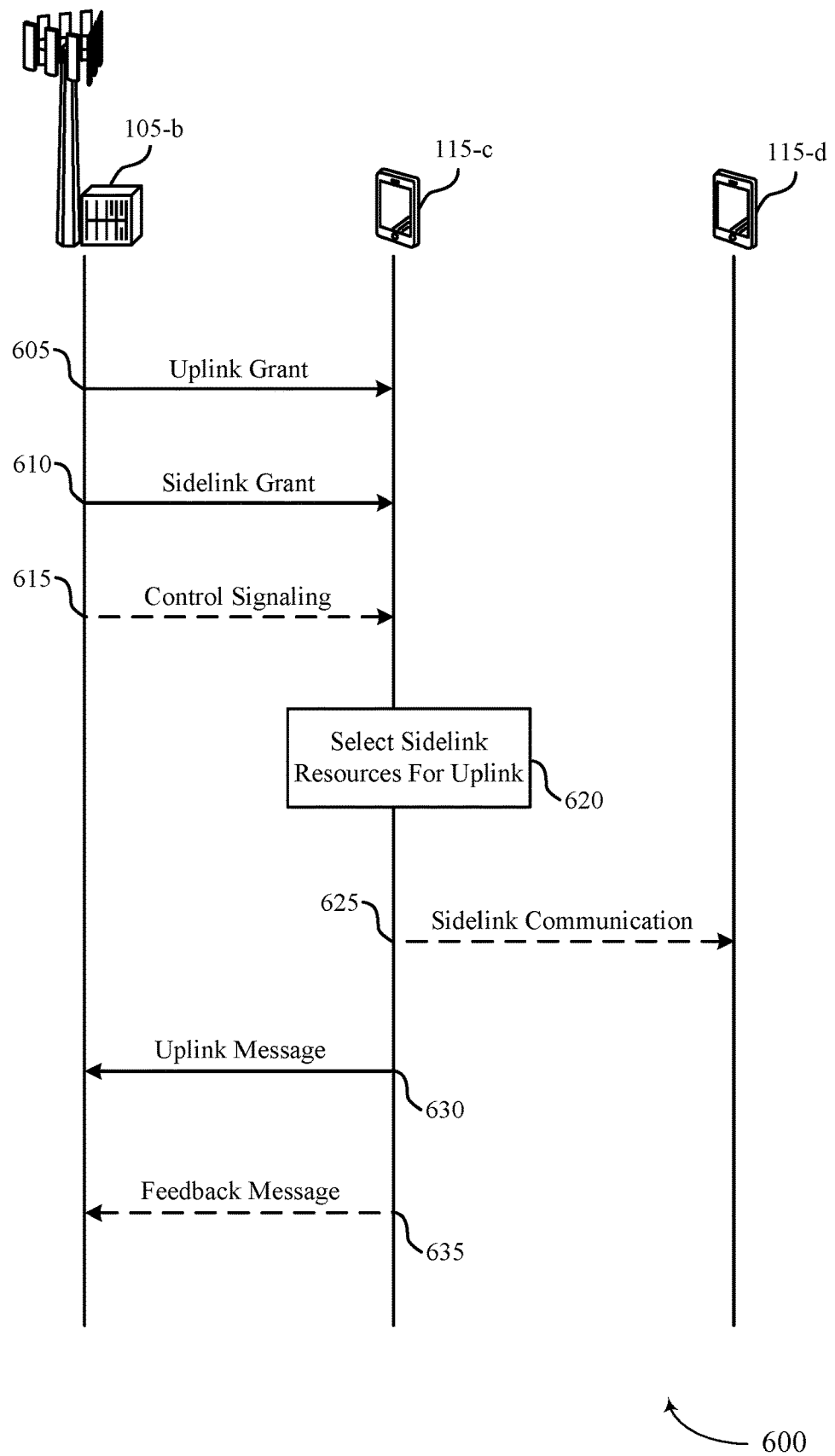
FIG. 6 illustrates an example of a process flow that supports uplink transmissions based on sidelink grants in accordance with one or more aspects of the present disclosure.

FIG. 6 illustrates an example of a process flow 600 that supports uplink transmissions based on sidelink grants in accordance with one or more aspects of the present disclosure. The process flow 600 may include a UE 115-*c*, a UE 115-*d*, and a network entity 105-*b*, which may be respective examples of UEs 115 and network entities 105 as described with reference to FIGS. 1-5. In some cases, UE 115-*c* may be in sidelink communication with the UE 115-*d* and in wireless communication with the network entity 105-*b*.

At 605, the network entity 105-*b* may optionally output an uplink grant. The uplink grant may indicate uplink resources on which the UE 115-*c* may transmit uplink signaling. In some cases, the uplink grant may include indications to use one or more uplink transmission parameters, for example, an MCS, one or more DMRSs, or the like. In some examples, the uplink grant may include an indication of one or more UCI parameters, such as an HPN, an NDI, a TDRA, an FDRA, a number of layers, a pre-coder, or an RV-ID, among other examples.

At 610, the network entity 105-*b* may output a sidelink grant. The sidelink grant may indicate sidelink resources on which to transmit sidelink signaling (e.g., a sidelink communication). In some cases, the sidelink grant may be of a different format than the uplink grant (e.g., a different DCI format) or via different signaling (e.g., DCI or RRC signaling). The sidelink grant may also indicate one or more resources (e.g., on a PUCCH) for sidelink feedback.

At 615, the network entity 105-*b* may output control signaling. The control signaling may indicate a priority threshold value associated with a preemption of sidelink resources for uplink communications (e.g., an uplink priority threshold value, or a pairwise priority threshold value). The control signaling (e.g., a same control signal as the threshold values, or separate control signaling) may include a subset of the sidelink resources (e.g., granted at 610) that are available for transmitting an uplink message (e.g., one or more monitoring occasions during which the network entity 105-*b* may monitor for uplink signaling during granted sidelink resources). In some cases, control signaling (e.g., a single message or multiple different messages) may include an indication of a subset of the sidelink resources that are available for transmission of UCI. In some cases, the subset of the sidelink resources that are available for transmitting the UCI may be associated with a fixed position within the sidelink resources. In some examples, the control signaling (e.g., a dedicated control message or a same control message described herein at 615) may include one or more of the uplink transmission parameters, for example, an MCS, a DMRS, an HPN, an NDI, a TDRA, an FDRA, a number of layers, a pre-coder, or an RV-ID, among other examples, or any combination thereof. In some examples, control signaling (e.g., a dedicated control message or a same control message as described herein at 615) may include an indication of a second priority threshold value associated with retransmission of a sidelink message. In some cases, the control signaling may be a DCI, a MAC-CE, an RRC, or another control message.

At 620, the UE 115-*c* may select sidelink resources for transmitting the uplink message. In some cases, the UE 115-*c* may select a portion of the sidelink resources (e.g., the subset of the sidelink resources indicated in the control signaling), or all of the sidelink resources, for transmitting the uplink message. For example, the UE 115-*c* may select to use the sidelink resources for the uplink message based on a first priority level satisfying the priority threshold value. In some cases, the UE 115-*c* may compare the first priority level (associated with the uplink message) and a second priority level associated with the sidelink communication, where the priority threshold value includes a priority difference threshold value associated with the first and second priority levels. The UE 115-c may select to use the sidelink resources for the uplink message based on a difference between the first and second priority levels satisfying the priority threshold value. In some cases, the UE 115-c may select to use the sidelink resources for the uplink message based on determining that a retransmission message (e.g., a priority level associated with the retransmission message) fails to satisfy the second priority threshold associated with retransmission of the sidelink message, the sidelink message is not a retransmission message, or both.

At 625, the UE 115-c may optionally transmit, to the UE 115-d, the sidelink communication. In some cases, the UE 115-c may determine to drop the sidelink communication (e.g., a pending sidelink message) based on the uplink message. For example, the UE 115-c may generate the uplink message with a high priority level. The UE 115-c may determine to use the sidelink resources for transmitting the uplink message. In some cases, the UE 115-c may use all of the sidelink resources or a portion of the sidelink resources. If the UE 115-c uses all of the sidelink resources, the UE 115-c may drop the sidelink communication and transmit a feedback message (e.g., optionally at 635), to the network entity 105-b, indicating that the UE 115-c used the sidelink resources for transmitting the uplink message (e.g., a NACK message or a sidelink dropped message). In some cases, the feedback message may include a NACK or an indication that the pending sidelink message were dropped (e.g., SL-dropping). In some examples, where the UE 115-c uses the portion of the sidelink resources, the UE 115-c may transmit the sidelink communication using the unused sidelink resources and the feedback message may include a sidelink ACK or a sidelink NACK, indicating whether the sidelink communication was successfully communicated.

At 630, the UE 115-c may transmit, to the network entity 105-b, the uplink message via the sidelink resources based on the first priority level associated with the uplink message. In some cases, the UE 115-c may transmit (or may include in the sidelink message) UCI. The UE 115-c may transmit the UCI in the subset of the sidelink resources that the network entity 105-b indicated are available for transmitting the UCI. In some examples, the UE 115-c may include, in the uplink transmission on the selected resources, UCI. The UCI may include one or more of the uplink transmission parameters. In some examples, the control signaling may include one or more uplink transmission parameters, for example, an MCS, a DMRS, an HPN, an NDI, a TDRA, an FDRA, a number of layers, a pre-coder, or an RV-ID, among other examples.

Figure 7:
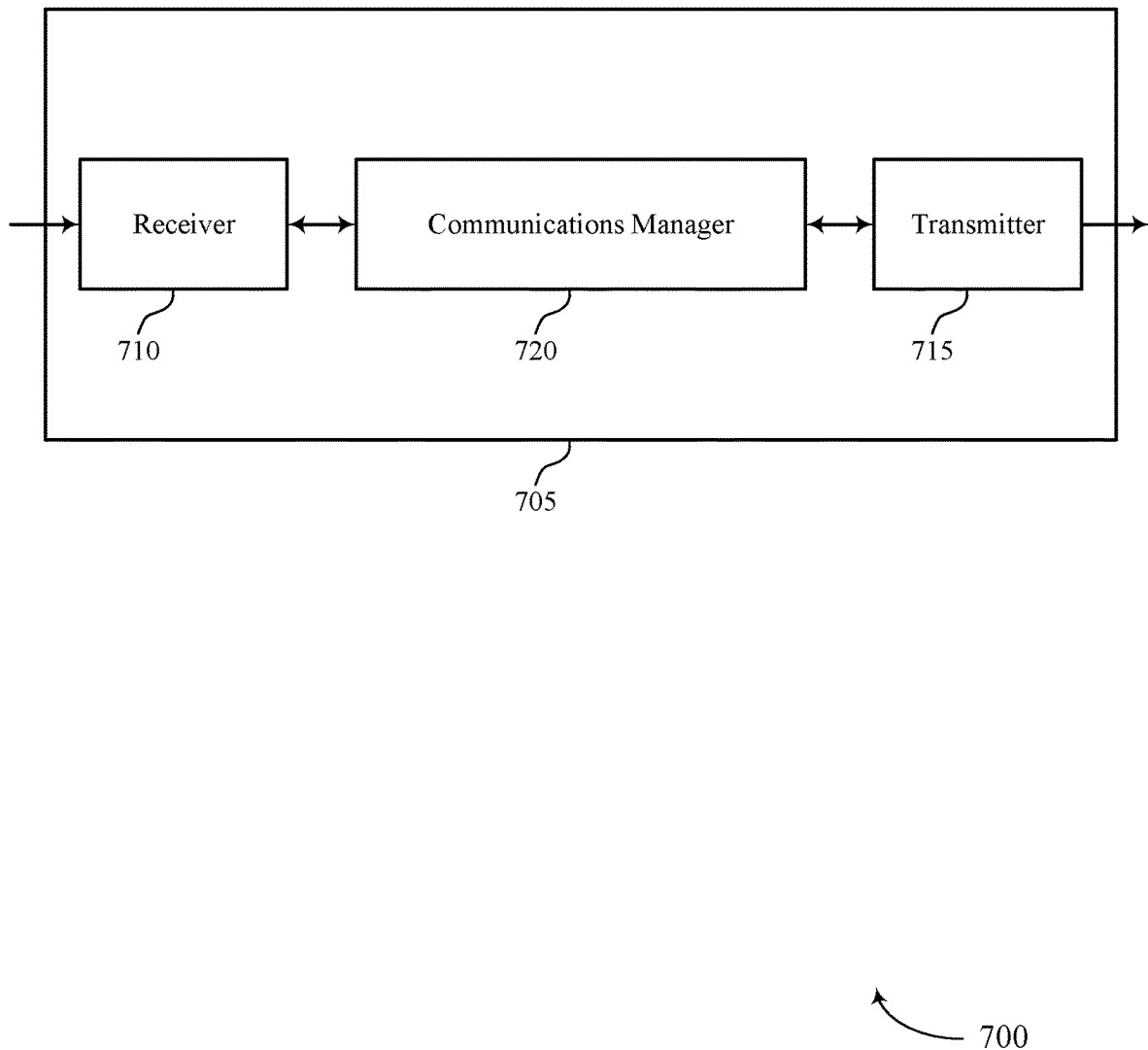
FIGS. 7 and 8 show block diagrams of devices that support uplink transmissions based on sidelink grants in accordance with one or more aspects of the present disclosure.

FIG. 7 shows a block diagram 700 of a device 705 that supports uplink transmissions based on sidelink grants in accordance with one or more aspects of the present disclosure. The device 705 may be an example of aspects of a UE 115 as described herein. The device 705 may include a receiver 710, a transmitter 715, and a communications manager 720. The device 705 may also include at least one processor. Each of these components may be in communication with one another (e.g., via one or more buses).

The receiver 710 may provide a means for receiving information such as packets, user data, control information, or any combination thereof associated with various information channels (e.g., control channels, data channels, information channels related to uplink transmissions based on sidelink grants). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to uplink transmissions based on sidelink grants). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of uplink transmissions based on sidelink grants as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software) executed by at least one processor. If implemented in code executed by a processor, the functions of the communications manager 720, the receiver 710, the transmitter 715, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for receiving an uplink grant indicating uplink resources on which to transmit uplink signaling. The communications manager 720 may be configured as or otherwise support a means for receiving a sidelink grant indicating sidelink resources on which to transmit sidelink signaling. The communications manager 720 may be configured as or otherwise support a means for transmitting an uplink message via the sidelink resources.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources, increased flexibility for different types of communications, and reduced latency for uplink traffic.

Figure 8:
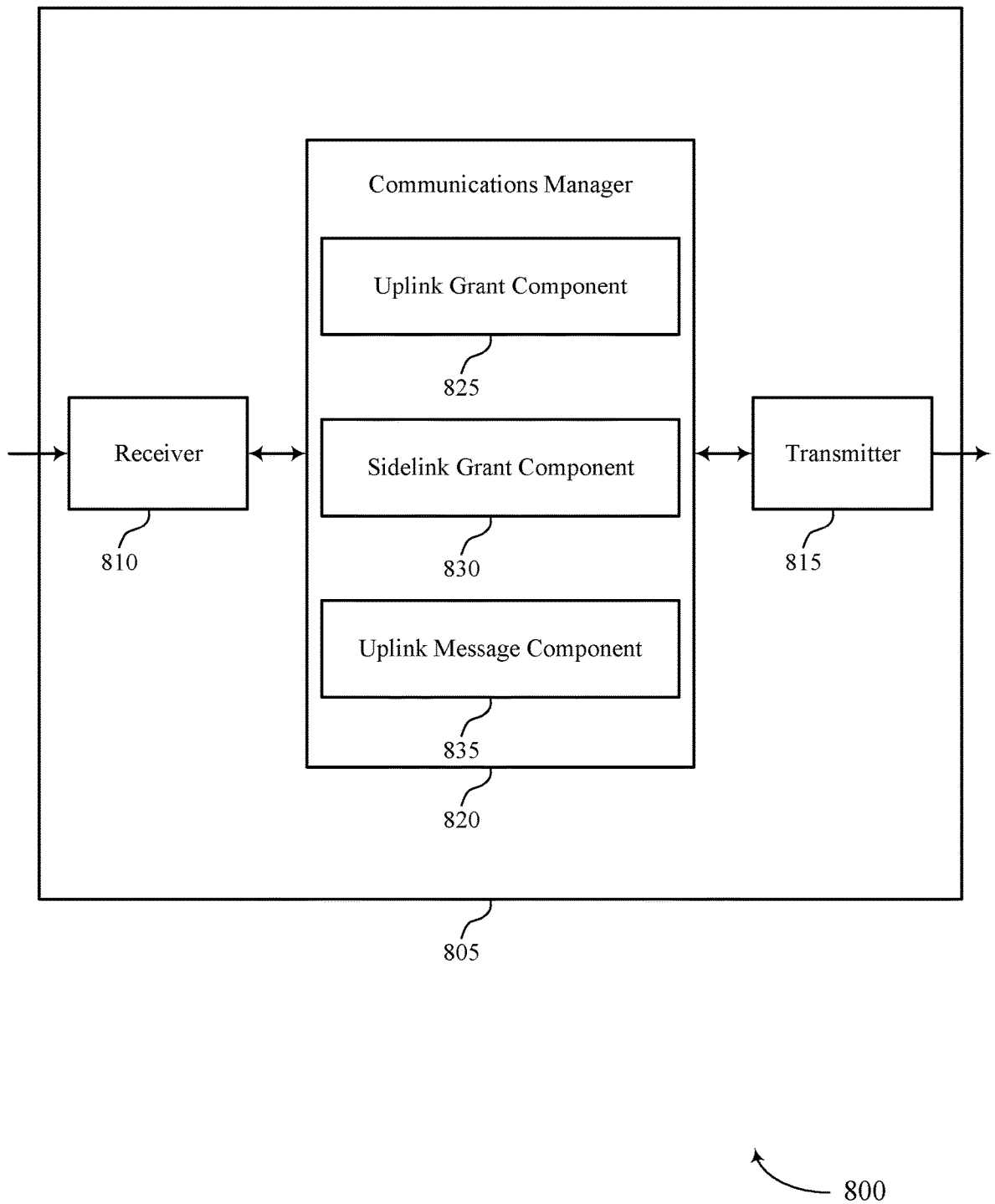

FIG. 8 shows a block diagram 800 of a device 805 that supports uplink transmissions based on sidelink grants in accordance with one or more aspects of the present disclosure. The device 805 may be an example of aspects of a device 705 or a UE 115 as described herein. The device 805 may include a receiver 810, a transmitter 815, and a communications manager 820. The device 805 may also include at least one processor. Each of these components may be in communication with one another (e.g., via one or more buses).

The receiver 810 may provide a means for receiving information such as packets, user data, control information, or any combination thereof associated with various information channels (e.g., control channels, data channels, information channels related to uplink transmissions based on sidelink grants). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to uplink transmissions based on sidelink grants). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of uplink transmissions based on sidelink grants as described herein. For example, the communications manager 820 may include an uplink grant component 825, a sidelink grant component 830, an uplink message component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The uplink grant component 825 may be configured as or otherwise support a means for receiving an uplink grant indicating uplink resources on which to transmit uplink signaling. The sidelink grant component 830 may be configured as or otherwise support a means for receiving a sidelink grant indicating sidelink resources on which to transmit sidelink signaling. The uplink message component 835 may be configured as or otherwise support a means for transmitting an uplink message via the sidelink resources.

Figure 9:
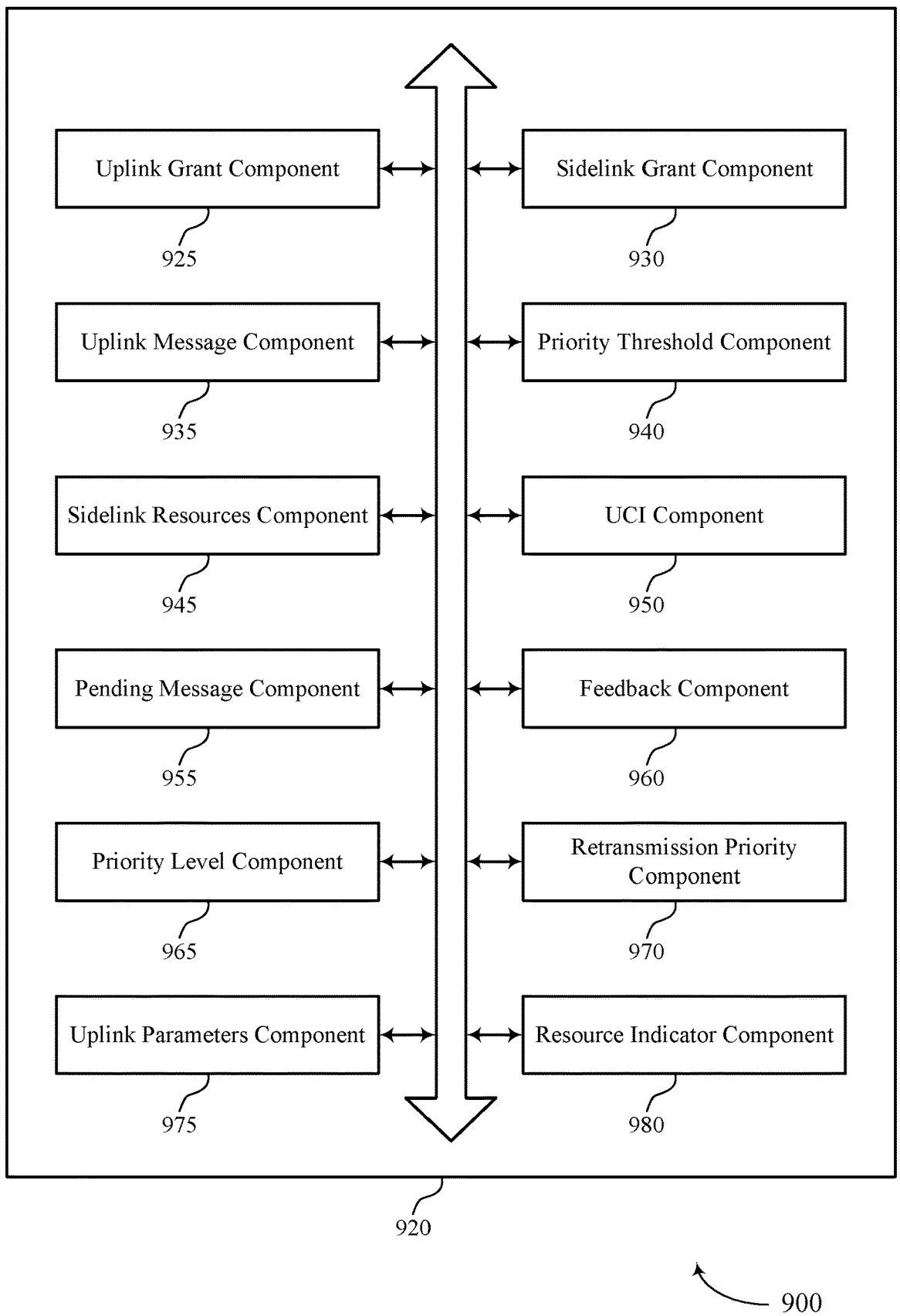
FIG. 9 shows a block diagram of a communications manager that supports uplink transmissions based on sidelink grants in accordance with one or more aspects of the present disclosure.

FIG. 9 shows a block diagram 900 of a communications manager 920 that supports uplink transmissions based on sidelink grants in accordance with one or more aspects of the present disclosure. The communications manager 920 may be an example of aspects of a communications manager 720, a communications manager 820, or both, as described herein. The communications manager 920, or various components thereof, may be an example of means for performing various aspects of uplink transmissions based on sidelink grants as described herein. For example, the communications manager 920 may include an uplink grant component 925, a sidelink grant component 930, an uplink message component 935, a priority threshold component 940, a sidelink resources component 945, a UCI component 950, a pending message component 955, a feedback component 960, a priority level component 965, a retransmission priority component 970, an uplink parameters component 975, a resource indicator component 980, or any combination thereof. Each of these components may communicate, directly or indirectly, with one another (e.g., via one or more buses).

The communications manager 920 may support wireless communications at a UE in accordance with examples as disclosed herein. The uplink grant component 925 may be configured as or otherwise support a means for receiving an uplink grant indicating uplink resources on which to transmit uplink signaling. The sidelink grant component 930 may be configured as or otherwise support a means for receiving a sidelink grant indicating sidelink resources on which to transmit sidelink signaling. The uplink message component 935 may be configured as or otherwise support a means for transmitting an uplink message via the sidelink resources.

In some examples, the priority threshold component 940 may be configured as or otherwise support a means for receiving control signaling indicating a priority threshold value associated with a preemption of sidelink resources for uplink communications, where transmitting the uplink message is based on a first priority level associated with the uplink message.

In some examples, the priority level component 965 may be configured as or otherwise support a means for comparing the first priority level with a second priority level associated with a pending sidelink message, where the priority threshold value includes a priority difference threshold value associated with the first priority level and the second priority level, and where transmitting the uplink message via the sidelink resources is based on a difference between the first priority level and the second priority level satisfying the priority threshold value.

In some examples, the priority level component 965 may be configured as or otherwise support a means for determining that the first priority level satisfies the priority threshold value, where the priority threshold value is associated with the first priority level, and where transmitting the uplink message via the sidelink resources is based on the first priority level satisfying the priority threshold value.

In some examples, the retransmission priority component 970 may be configured as or otherwise support a means for receiving control signaling indicating a second priority threshold value associated with retransmission of a sidelink message. In some examples, the priority level component 965 may be configured as or otherwise support a means for determining that a retransmission message associated with the sidelink resources fails to satisfy the second priority threshold value or that the sidelink message associated with the sidelink resources is not a retransmission message, where transmitting the uplink message via the sidelink resources is based on the determining.

In some examples, the sidelink resources component 945 may be configured as or otherwise support a means for receiving control signaling indicating a subset of the sidelink resources that are available for transmission of the uplink message. In some examples, the sidelink resources component 945 may be configured as or otherwise support a means for selecting the subset of sidelink resources from the sidelink resources, where transmitting the uplink message includes transmitting the uplink message via the subset of sidelink resources.

In some examples, to support transmitting the uplink message via the sidelink resources, the UCI component 950 may be configured as or otherwise support a means for transmitting, in a subset of the sidelink resources, UCI including a set of multiple parameters associated with the uplink message, where transmitting the uplink message is based on the UCI.

In some examples, the set of multiple parameters includes an MCS, a DMRS, an HPN, a TDRA associated with the sidelink resources, an FDRA associated with the sidelink resources, a number of layers, a pre-coder, an NDI, an RV-ID, or any combination thereof.

In some examples, the uplink parameters component 975 may be configured as or otherwise support a means for receiving control signaling indicating one or more of the set of multiple parameters, where transmitting the UCI is based on control signaling indicating the one or more of the set of multiple parameters.

In some examples, the resource indicator component 980 may be configured as or otherwise support a means for receiving an indication of the subset of the sidelink resources.

In some examples, the subset of sidelink resources is associated with a fixed position within the sidelink resources.

In some examples, the pending message component 955 may be configured as or otherwise support a means for dropping a pending sidelink message based on transmitting the uplink message via the sidelink resources. In some examples, the feedback component 960 may be configured as or otherwise support a means for transmitting a feedback message indicating that the UE used the sidelink resources for transmitting the uplink message.

In some examples, the feedback message includes a NACK message or an indication that the pending sidelink message has been dropped.

Figure 10:
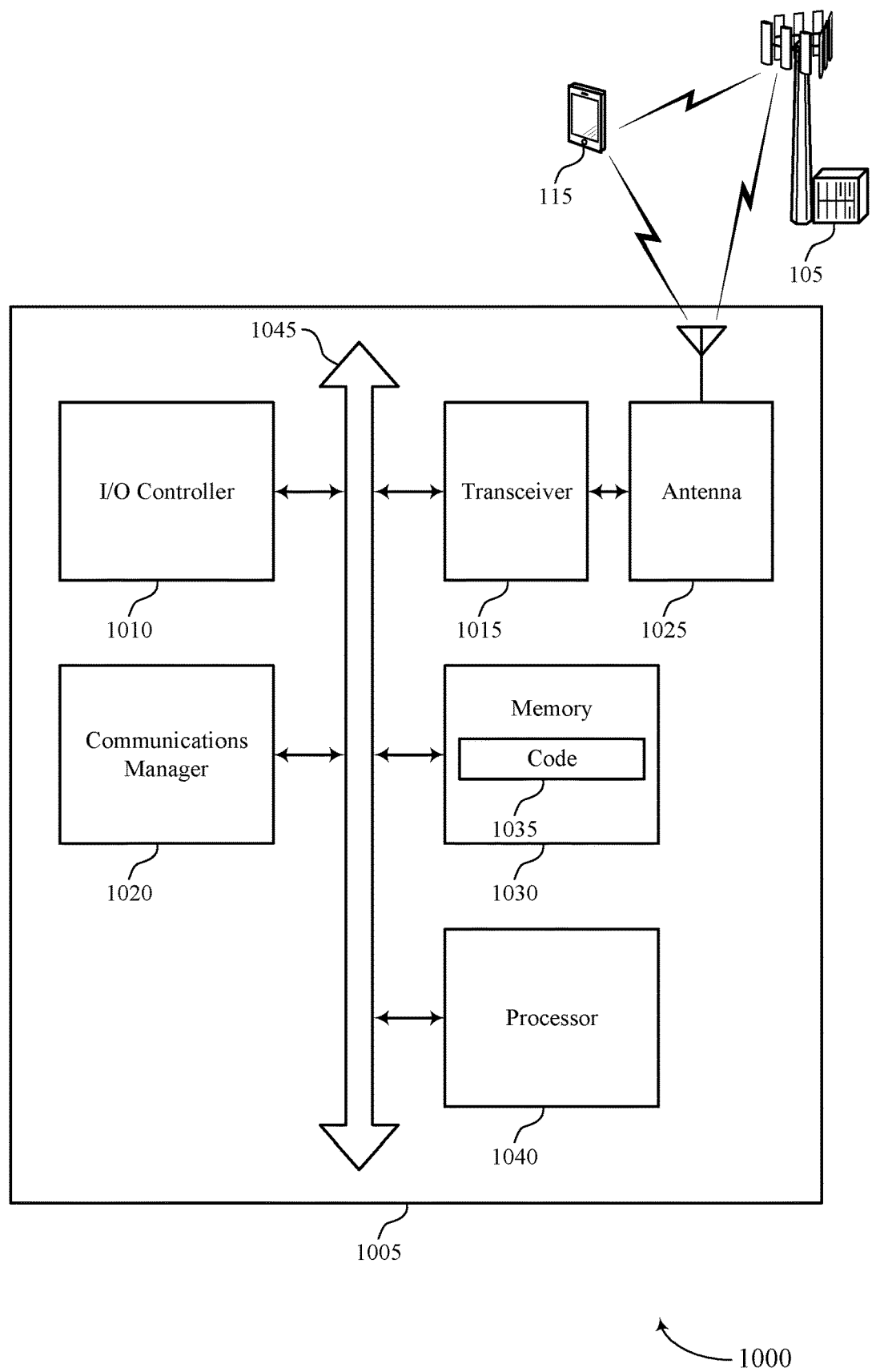
FIG. 10 shows a diagram of a system including a device that supports uplink transmissions based on sidelink grants in accordance with one or more aspects of the present disclosure.

FIG. 10 shows a diagram of a system 1000 including a device 1005 that supports uplink transmissions based on sidelink grants in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting uplink transmissions based on sidelink grants). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving an uplink grant indicating uplink resources on which to transmit uplink signaling. The communications manager 1020 may be configured as or otherwise support a means for receiving a sidelink grant indicating sidelink resources on which to transmit sidelink signaling. The communications manager 1020 may be configured as or otherwise support a means for transmitting an uplink message via the sidelink resources.

By including or configuring the communications manager 1020 in accordance with examples as described herein, the device 1005 may support techniques for more efficient utilization of communication resources, more efficient use of computational resources, improved system latency and user experience, increased flexibility for different types of communications, and reduced latency for uplink traffic.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of uplink transmissions based on sidelink grants as described herein, or the processor 1040 and the memory 1030 may be otherwise configured to perform or support such operations.

Figure 11:
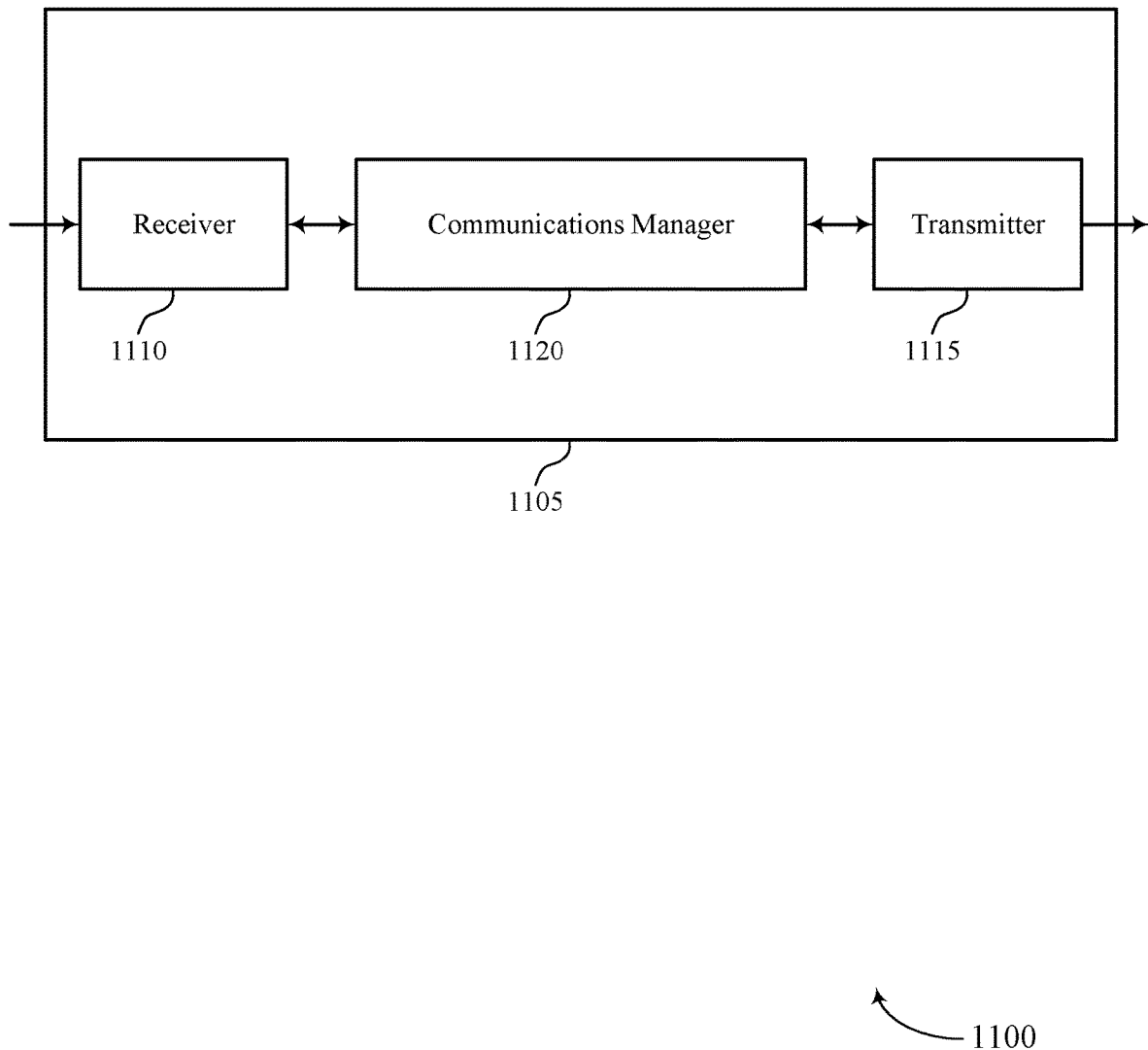
FIGS. 11 and 12 show block diagrams of devices that support uplink transmissions based on sidelink grants in accordance with one or more aspects of the present disclosure.

FIG. 11 shows a block diagram 1100 of a device 1105 that supports uplink transmissions based on sidelink grants in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include at least one processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of uplink transmissions based on sidelink grants as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include at least one processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software) executed by at least one processor. If implemented in code executed by a processor, the functions of the communications manager 1120, the receiver 1110, the transmitter 1115, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 may be configured as or otherwise support a means for outputting an uplink grant for a UE indicating uplink resources on which the UE is to transmit uplink signaling. The communications manager 1120 may be configured as or otherwise support a means for outputting a sidelink grant for the UE indicating sidelink resources on which the UE is to transmit sidelink signaling. The communications manager 1120 may be configured as or otherwise support a means for obtaining an uplink message via the sidelink resources.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources, increased flexibility for different types of communications, and reduced latency for uplink traffic.

Figure 12:
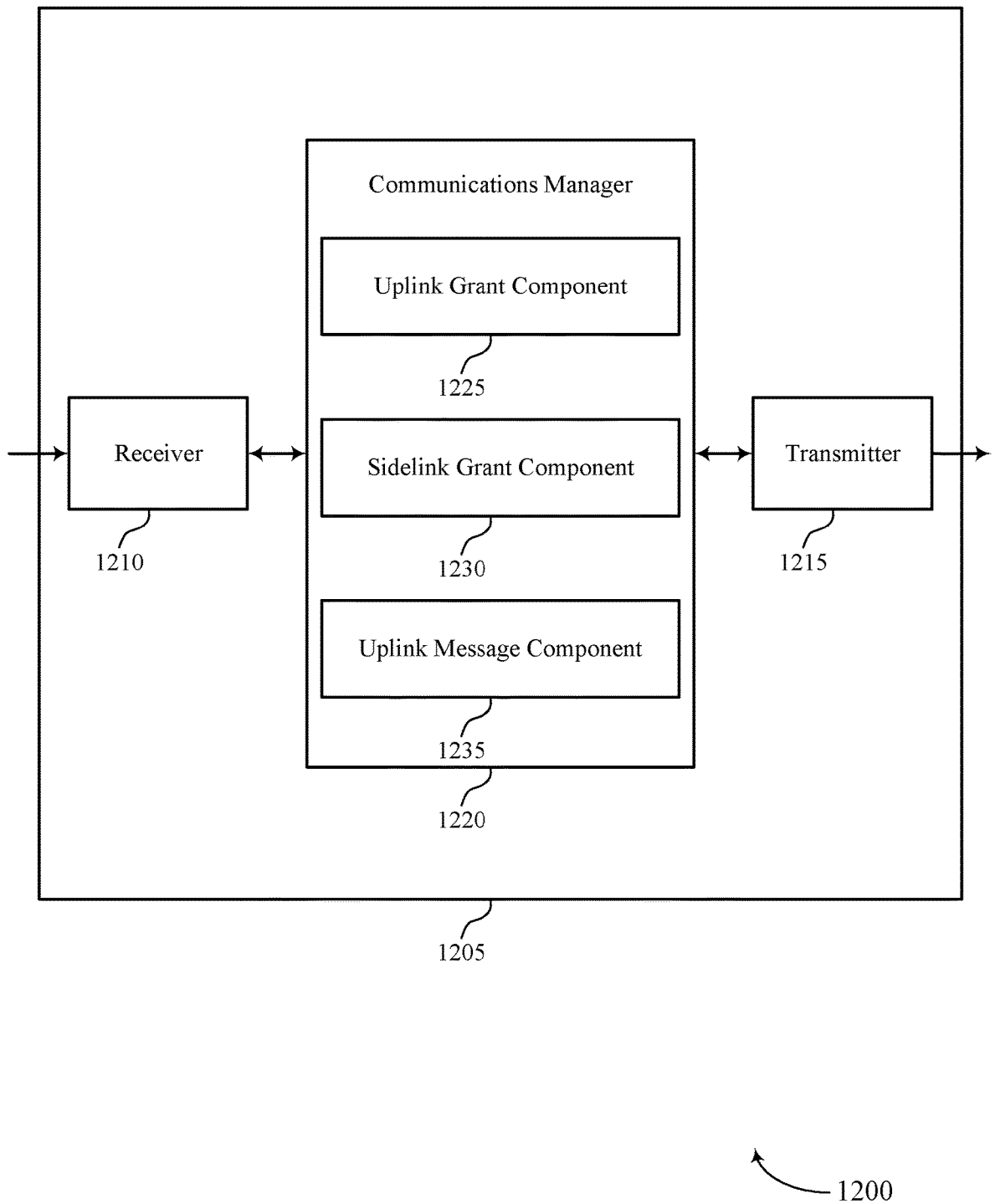

FIG. 12 shows a block diagram 1200 of a device 1205 that supports uplink transmissions based on sidelink grants in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include at least one processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of uplink transmissions based on sidelink grants as described herein. For example, the communications manager 1220 may include an uplink grant component 1225, a sidelink grant component 1230, an uplink message component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The uplink grant component 1225 may be configured as or otherwise support a means for outputting an uplink grant for a UE indicating uplink resources on which the UE is to transmit uplink signaling. The sidelink grant component 1230 may be configured as or otherwise support a means for outputting a sidelink grant for the UE indicating sidelink resources on which the UE is to transmit sidelink signaling. The uplink message component 1235 may be configured as or otherwise support a means for obtaining an uplink message via the sidelink resources.

Figure 13:
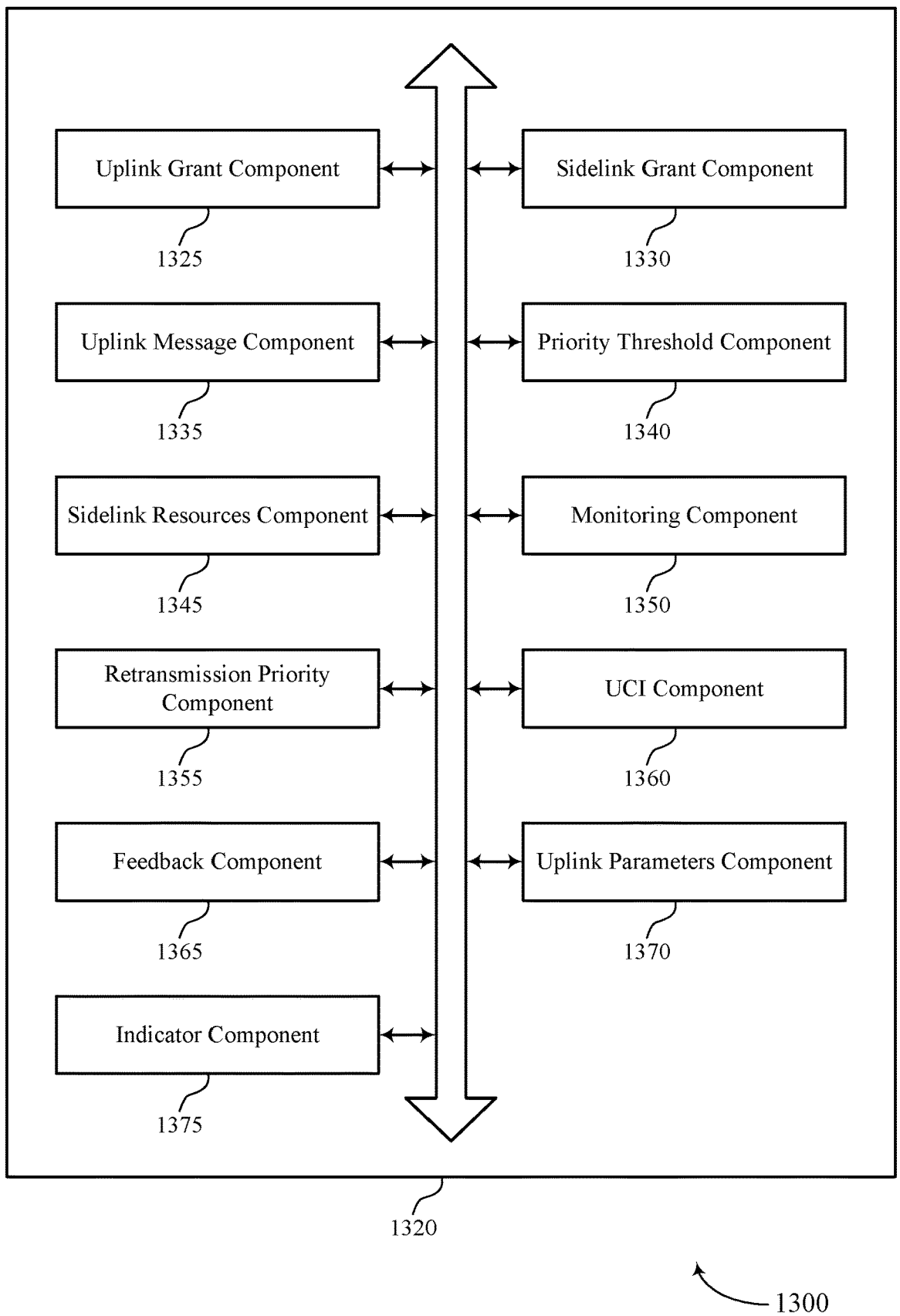
FIG. 13 shows a block diagram of a communications manager that supports uplink transmissions based on sidelink grants in accordance with one or more aspects of the present disclosure.

FIG. 13 shows a block diagram 1300 of a communications manager 1320 that supports uplink transmissions based on sidelink grants in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of uplink transmissions based on sidelink grants as described herein. For example, the communications manager 1320 may include an uplink grant component 1325, a sidelink grant component 1330, an uplink message component 1335, a priority threshold component 1340, a sidelink resources component 1345, a monitoring component 1350, a retransmission priority component 1355, a UCI component 1360, a feedback component 1365, an uplink parameters component 1370, an indicator component 1375, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The uplink grant component 1325 may be configured as or otherwise support a means for outputting an uplink grant for a UE indicating uplink resources on which the UE is to transmit uplink signaling. The sidelink grant component 1330 may be configured as or otherwise support a means for outputting a sidelink grant for the UE indicating sidelink resources on which the UE is to transmit sidelink signaling. The uplink message component 1335 may be configured as or otherwise support a means for obtaining an uplink message via the sidelink resources.

In some examples, the priority threshold component 1340 may be configured as or otherwise support a means for outputting control signaling indicating a priority threshold value associated with a preemption of sidelink resources for uplink communications, where outputting the uplink message is based on a first priority level associated with the uplink message.

In some examples, the priority threshold value includes a priority difference threshold value associated with the first priority level and a second priority level associated with a pending sidelink signaling.

In some examples, the priority threshold value is associated with the first priority level.

In some examples, the sidelink resources component 1345 may be configured as or otherwise support a means for outputting control signaling indicating a subset of the sidelink resources that are available for transmission of the uplink message. In some examples, the monitoring component 1350 may be configured as or otherwise support a means for monitoring the subset of the sidelink resources for the uplink message, where obtaining the uplink message via the sidelink resources is based on the monitoring.

In some examples, the subset of the sidelink resources includes a subset of one or more monitoring occasions for obtaining uplink signaling via the sidelink resources.

In some examples, the subset of the sidelink resources partially overlaps with one or more monitoring occasions for obtaining uplink signaling via the sidelink resources.

In some examples, the retransmission priority component 1355 may be configured as or otherwise support a means for outputting control signaling indicating a third priority level associated with retransmission of a sidelink message.

In some examples, the UCI component 1360 may be configured as or otherwise support a means for obtaining, in a subset of the sidelink resources, UCI including a set of multiple parameters associated with the uplink message, where obtaining the uplink message is based on the UCI.

In some examples, the set of multiple parameters includes an MCS, a DMRS, an HPN, a TDRA associated with the sidelink resources, an FDRA associated with the sidelink resources, a number of layers, a pre-coder, an NDI, an RV-ID, or any combination thereof.

In some examples, the uplink parameters component 1370 may be configured as or otherwise support a means for outputting control signaling indicating one or more of the set of multiple parameters, where obtaining the UCI is based on the control signaling indicating the one or more of the set of multiple parameters.

In some examples, the indicator component 1375 may be configured as or otherwise support a means for outputting control signaling indicating the subset of the sidelink resources, where obtaining the UCI is based on outputting the control signaling indicating the subset of the sidelink resources.

In some examples, the subset of sidelink resources is associated with a fixed position within the sidelink resources.

In some examples, the feedback component 1365 may be configured as or otherwise support a means for obtaining a feedback message indicating that the UE used the sidelink resources for transmitting the uplink message.

In some examples, the feedback message includes a NACK message or an indication that a sidelink message has been dropped by the UE.

Figure 14:
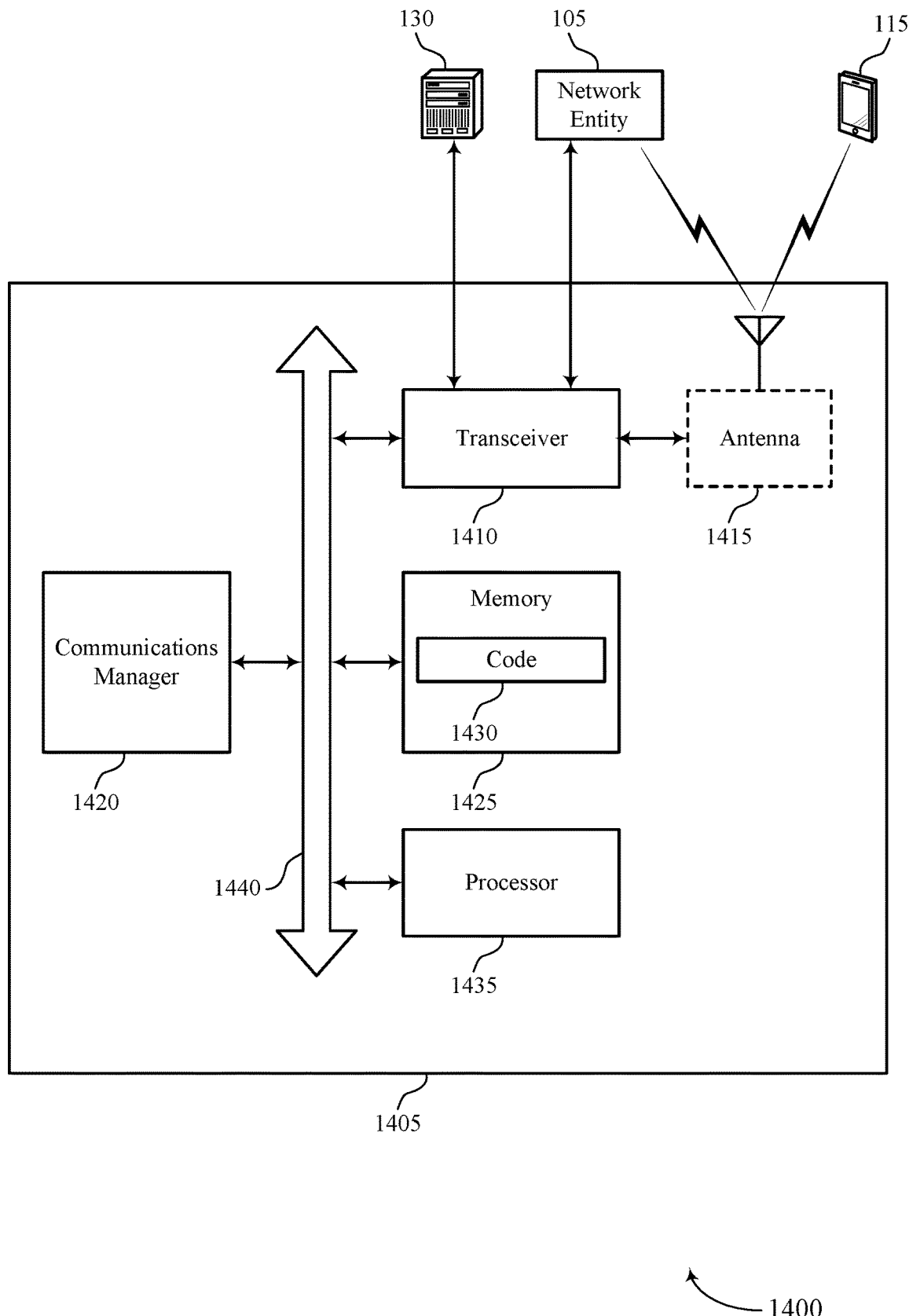
FIG. 14 shows a diagram of a system including a device that supports uplink transmissions based on sidelink grants in accordance with one or more aspects of the present disclosure.

FIG. 14 shows a diagram of a system 1400 including a device 1405 that supports uplink transmissions based on sidelink grants in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting uplink transmissions based on sidelink grants). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for outputting an uplink grant for a UE indicating uplink resources on which the UE is to transmit uplink signaling. The communications manager 1420 may be configured as or otherwise support a means for outputting a sidelink grant for the UE indicating sidelink resources on which the UE is to transmit sidelink signaling. The communications manager 1420 may be configured as or otherwise support a means for obtaining an uplink message via the sidelink resources.

By including or configuring the communications manager 1420 in accordance with examples as described herein, the device 1405 may support techniques for more efficient utilization of communication resources, more efficient use of computational resources, improved system latency and user experience, increased flexibility for different types of communications, and reduced latency for uplink traffic.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of uplink transmissions based on sidelink grants as described herein, or the processor 1435 and the memory 1425 may be otherwise configured to perform or support such operations.

Figure 15:
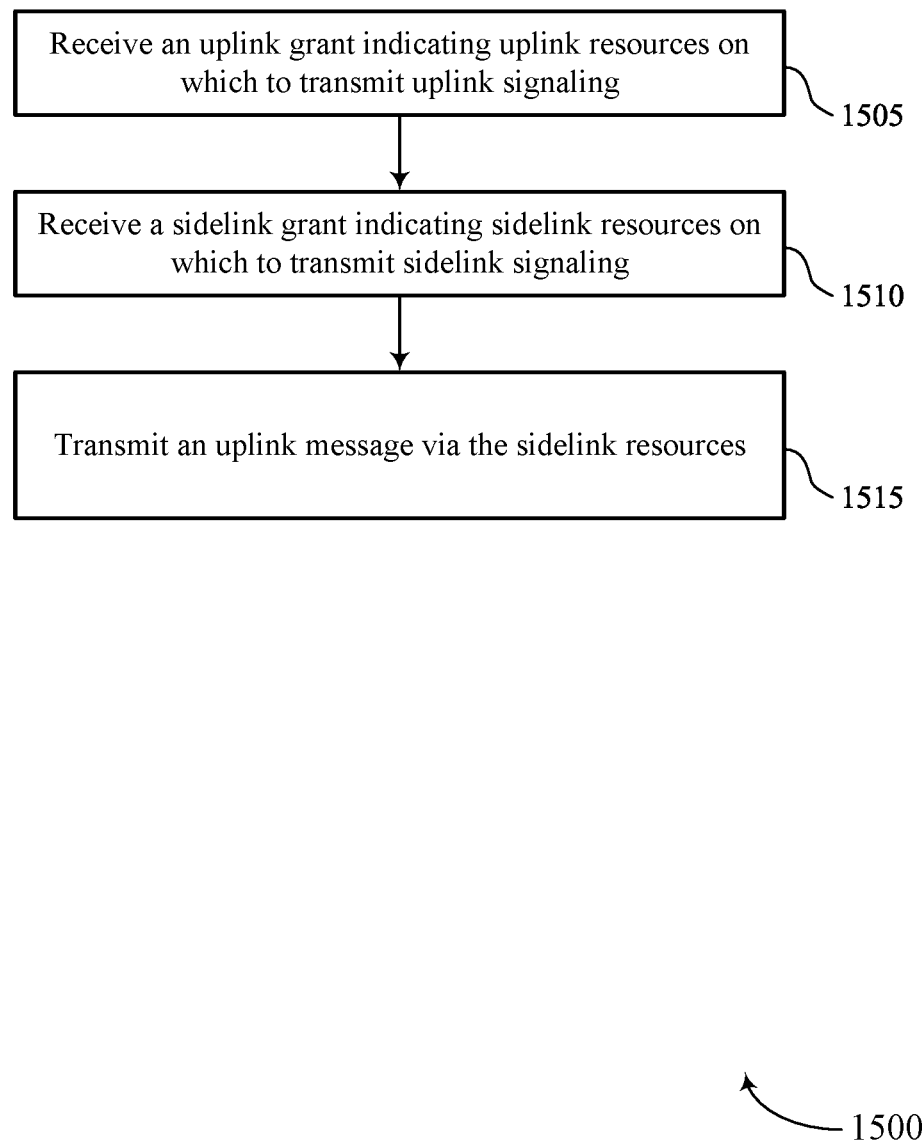
FIGS. 15 through 18 show flowcharts illustrating methods that support uplink transmissions based on sidelink grants in accordance with one or more aspects of the present disclosure.

FIG. 15 shows a flowchart illustrating a method 1500 that supports uplink transmissions based on sidelink grants in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving an uplink grant indicating uplink resources on which to transmit uplink signaling. The operations of 1505 may be performed in accordance with examples as disclosed herein. In some examples, aspects of the operations of 1505 may be performed by an uplink grant component 925 as described with reference to FIG. 9.

At 1510, the method may include receiving a sidelink grant indicating sidelink resources on which to transmit sidelink signaling. The operations of 1510 may be performed in accordance with examples as disclosed herein. In some examples, aspects of the operations of 1510 may be performed by a sidelink grant component 930 as described with reference to FIG. 9.

At 1515, the method may include transmitting an uplink message via the sidelink resources. The operations of 1515 may be performed in accordance with examples as disclosed herein. In some examples, aspects of the operations of 1515 may be performed by an uplink message component 935 as described with reference to FIG. 9.

Figure 16:
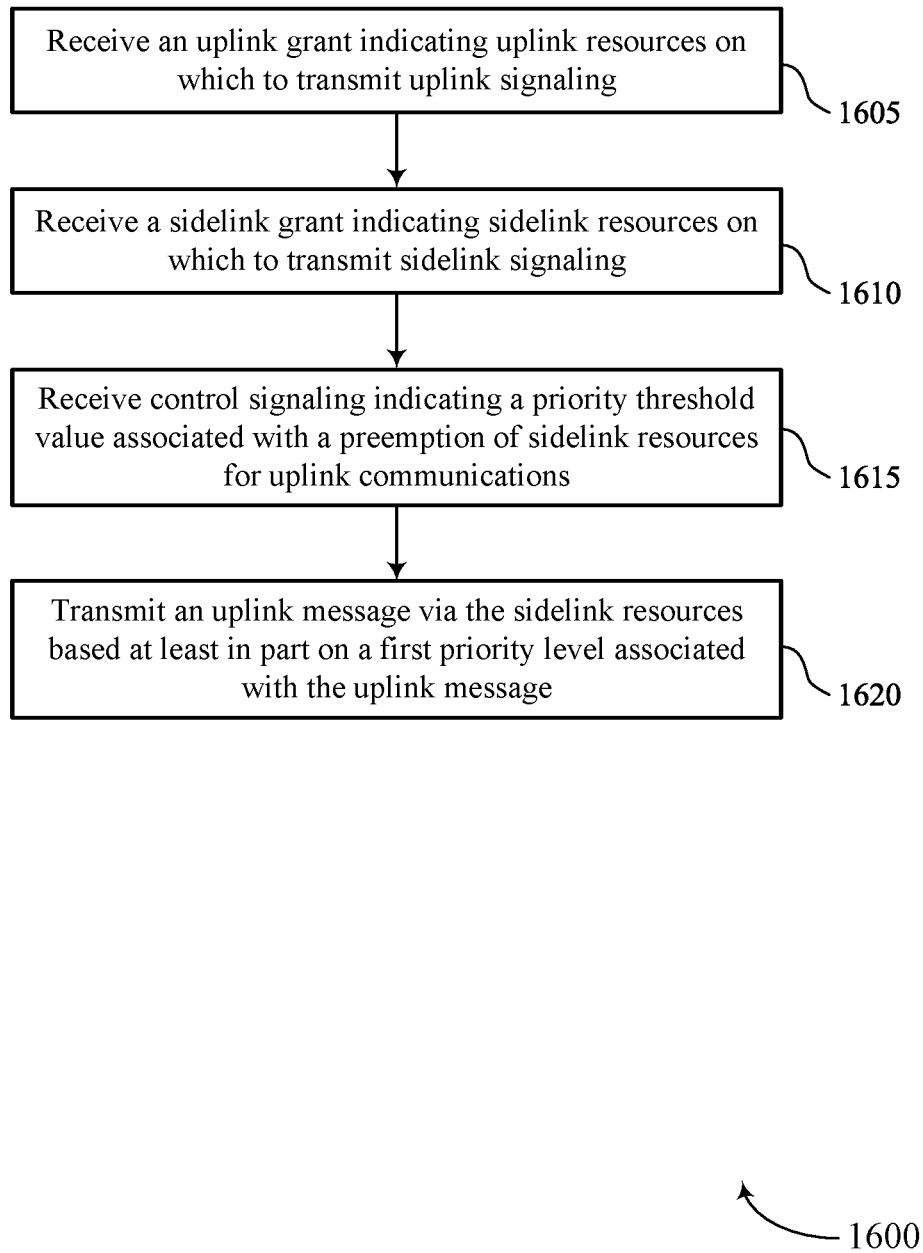

FIG. 16 shows a flowchart illustrating a method 1600 that supports uplink transmissions based on sidelink grants in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving an uplink grant indicating uplink resources on which to transmit uplink signaling. The operations of 1605 may be performed in accordance with examples as disclosed herein. In some examples, aspects of the operations of 1605 may be performed by an uplink grant component 925 as described with reference to FIG. 9.

At 1610, the method may include receiving a sidelink grant indicating sidelink resources on which to transmit sidelink signaling. The operations of 1610 may be performed in accordance with examples as disclosed herein. In some examples, aspects of the operations of 1610 may be performed by a sidelink grant component 930 as described with reference to FIG. 9.

At 1615, the method may include receiving control signaling indicating a priority threshold value associated with a preemption of sidelink resources for uplink communications. The operations of 1615 may be performed in accordance with examples as disclosed herein. In some examples, aspects of the operations of 1615 may be performed by a priority threshold component 940 as described with reference to FIG. 9.

At 1620, the method may include transmitting an uplink message via the sidelink resources based on a first priority level associated with the uplink message. The operations of 1620 may be performed in accordance with examples as disclosed herein. In some examples, aspects of the operations of 1620 may be performed by an uplink message component 935 as described with reference to FIG. 9.

Figure 17:
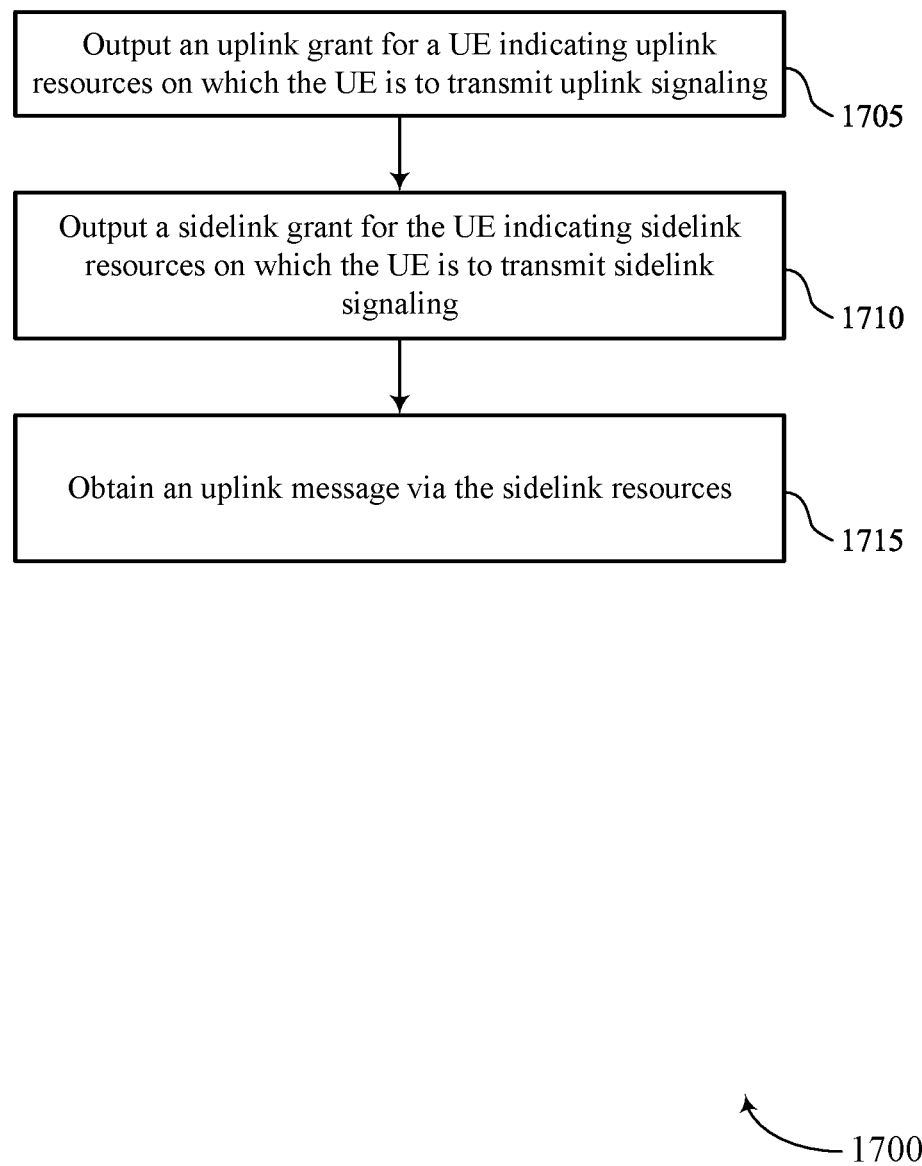

FIG. 17 shows a flowchart illustrating a method 1700 that supports uplink transmissions based on sidelink grants in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include outputting an uplink grant for a UE indicating uplink resources on which the UE is to transmit uplink signaling. The operations of 1705 may be performed in accordance with examples as disclosed herein. In some examples, aspects of the operations of 1705 may be performed by an uplink grant component 1325 as described with reference to FIG. 13.

At 1710, the method may include outputting a sidelink grant for the UE indicating sidelink resources on which the UE is to transmit sidelink signaling. The operations of 1710 may be performed in accordance with examples as disclosed herein. In some examples, aspects of the operations of 1710 may be performed by a sidelink grant component 1330 as described with reference to FIG. 13.

At 1715, the method may include obtaining an uplink message via the sidelink resources. The operations of 1715 may be performed in accordance with examples as disclosed herein. In some examples, aspects of the operations of 1715 may be performed by an uplink message component 1335 as described with reference to FIG. 13.

Figure 18:
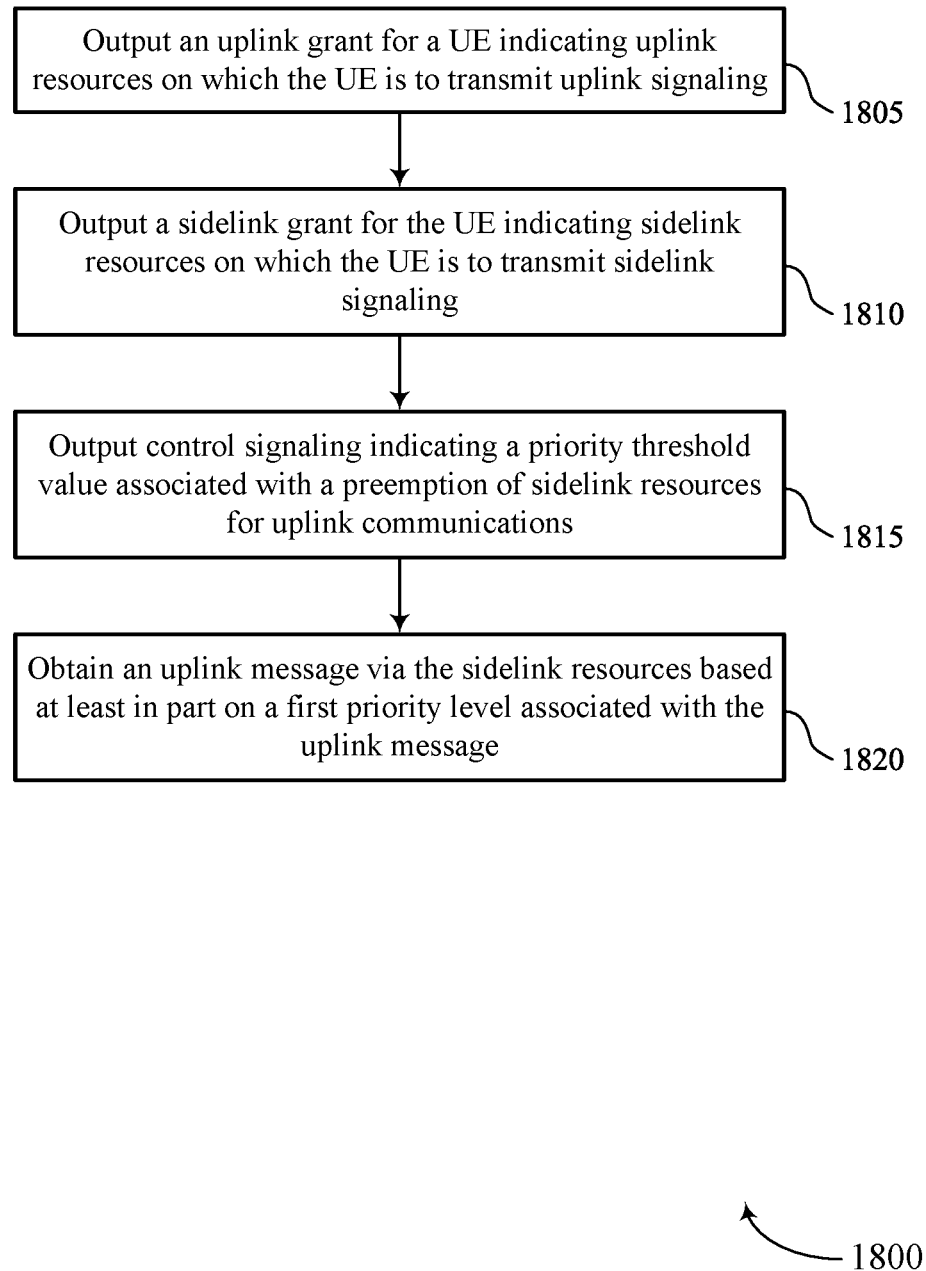

FIG. 18 shows a flowchart illustrating a method 1800 that supports uplink transmissions based on sidelink grants in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include outputting an uplink grant for a UE indicating uplink resources on which the UE is to transmit uplink signaling. The operations of 1805 may be performed in accordance with examples as disclosed herein. In some examples, aspects of the operations of 1805 may be performed by an uplink grant component 1325 as described with reference to FIG. 13.

At 1810, the method may include outputting a sidelink grant for the UE indicating sidelink resources on which the UE is to transmit sidelink signaling. The operations of 1810 may be performed in accordance with examples as disclosed herein. In some examples, aspects of the operations of 1810 may be performed by a sidelink grant component 1330 as described with reference to FIG. 13.

At 1815, the method may include outputting control signaling indicating a priority threshold value associated with a preemption of sidelink resources for uplink communications. The operations of 1815 may be performed in accordance with examples as disclosed herein. In some examples, aspects of the operations of 1815 may be performed by a priority threshold component 1340 as described with reference to FIG. 13.

At 1820, the method may include obtaining an uplink message via the sidelink resources based on a first priority level associated with the uplink message. The operations of 1820 may be performed in accordance with examples as disclosed herein. In some examples, aspects of the operations of 1820 may be performed by an uplink message component 1335 as described with reference to FIG. 13.

Aspect 1: A method for wireless communications at a UE, comprising: receiving an uplink grant indicating uplink resources on which to transmit uplink signaling; receiving a sidelink grant indicating sidelink resources on which to transmit sidelink signaling; and transmitting an uplink message via the sidelink resources.

Aspect 2: The method of aspect 1, further comprising: receiving control signaling indicating a priority threshold value associated with a preemption of sidelink resources for uplink communications, wherein transmitting the uplink message is based at least in part on a first priority level associated with the uplink message.

Aspect 3: The method of aspect 2, further comprising: comparing the first priority level with a second priority level associated with a pending sidelink message, wherein the priority threshold value comprises a priority difference threshold value associated with the first priority level and the second priority level, and wherein transmitting the uplink message via the sidelink resources is based at least in part on a difference between the first priority level and the second priority level satisfying the priority threshold value.

Aspect 4: The method of any of aspects 2 through 3, further comprising: determining that the first priority level satisfies the priority threshold value, wherein the priority threshold value is associated with the first priority level, and wherein transmitting the uplink message via the sidelink resources is based at least in part on the first priority level satisfying the priority threshold value.

Aspect 5: The method of any of aspects 2 through 4, further comprising: receiving control signaling indicating a second priority threshold value associated with retransmission of a sidelink message; and determining that a retransmission message associated with the sidelink resources fails to satisfy the second priority threshold value or that the sidelink message associated with the sidelink resources is not a retransmission message, wherein transmitting the uplink message via the sidelink resources is based at least in part on the determining.

Aspect 6: The method of any of aspects 1 through 5, further comprising: receiving control signaling indicating a subset of the sidelink resources that are available for transmission of the uplink message; and selecting the subset of sidelink resources from the sidelink resources, wherein transmitting the uplink message comprises transmitting the uplink message via the subset of sidelink resources.

Aspect 7: The method of any of aspects 1 through 6, wherein transmitting the uplink message via the sidelink resources comprises: transmitting, in a subset of the sidelink resources, UCI comprising a plurality of parameters associated with the uplink message, wherein transmitting the uplink message is based at least in part on the UCI.

Aspect 8: The method of aspect 7, wherein the plurality of parameters comprises a modulation and coding scheme, a demodulation reference signal, a hybrid automatic request process number, a time domain resource allocation associated with the sidelink resources, a frequency resource allocation associated with the sidelink resources, a number of layers, a pre-coder, a new data indicator, a redundancy version identifier, or any combination thereof.

Aspect 9: The method of any of aspects 7 through 8, further comprising: receiving control signaling indicating one or more of the plurality of parameters, wherein transmitting the UCI is based at least in part on control signaling indicating the one or more of the plurality of parameters.

Aspect 10: The method of any of aspects 7 through 9, further comprising: receiving an indication of the subset of the sidelink resources.

Aspect 11: The method of any of aspects 7 through 10, wherein the subset of sidelink resources is associated with a fixed position within the sidelink resources.

Aspect 12: The method of any of aspects 1 through 11, further comprising: dropping a pending sidelink message based at least in part on transmitting the uplink message via the sidelink resources; and transmitting a feedback message indicating that the UE used the sidelink resources for transmitting the uplink message.

Aspect 13: The method of aspect 12, wherein the feedback message comprises a NACK message or an indication that the pending sidelink message has been dropped.

Aspect 14: A method for wireless communications at a network entity, comprising: outputting an uplink grant for a UE indicating uplink resources on which the UE is to transmit uplink signaling; outputting a sidelink grant for the UE indicating sidelink resources on which the UE is to transmit sidelink signaling; and obtaining an uplink message via the sidelink resources.

Aspect 15: The method of aspect 14, further comprising: outputting control signaling indicating a priority threshold value associated with a preemption of sidelink resources for uplink communications, wherein obtaining the uplink message is based at least in part on a first priority level associated with the uplink message.

Aspect 16: The method of aspect 15, wherein the priority threshold value comprises a priority difference threshold value associated with the first priority level and a second priority level associated with a pending sidelink signaling.

Aspect 17: The method of any of aspects 15 through 16, wherein the priority threshold value is associated with the first priority level.

Aspect 18: The method of any of aspects 14 through 17, further comprising: outputting control signaling indicating a subset of the sidelink resources that are available for transmission of the uplink message; and monitoring the subset of the sidelink resources for the uplink message, wherein obtaining the uplink message via the sidelink resources is based at least in part on the monitoring.

Aspect 19: The method of aspect 18, wherein the subset of the sidelink resources comprises a subset of one or more monitoring occasions for obtaining uplink signaling via the sidelink resources.

Aspect 20: The method of any of aspects 18 through 19, wherein the subset of the sidelink resources partially overlaps with one or more monitoring occasions for obtaining uplink signaling via the sidelink resources.

Aspect 21: The method of any of aspects 14 through 20, further comprising: outputting control signaling indicating a third priority level associated with retransmission of a sidelink message.

Aspect 22: The method of any of aspects 14 through 21, further comprising: obtaining, in a subset of the sidelink resources, UCI comprising a plurality of parameters associated with the uplink message, wherein obtaining the uplink message is based at least in part on the UCI.

Aspect 23: The method of aspect 22, wherein the plurality of parameters comprises a modulation and coding scheme, a demodulation reference signal, a hybrid automatic request process number, a time domain resource allocation associated with the sidelink resources, a frequency resource allocation associated with the sidelink resources, a number of layers, a pre-coder, a new data indicator, a redundancy version identifier, or any combination thereof.

Aspect 24: The method of any of aspects 22 through 23, further comprising: outputting control signaling indicating one or more of the plurality of parameters, wherein obtaining the UCI is based at least in part on the control signaling indicating the one or more of the plurality of parameters.

Aspect 25: The method of any of aspects 22 through 24, further comprising: outputting control signaling indicating the subset of the sidelink resources, wherein obtaining the UCI is based at least in part on outputting the control signaling indicating the subset of the sidelink resources.

Aspect 26: The method of any of aspects 22 through 25, wherein the subset of sidelink resources is associated with a fixed position within the sidelink resources.

Aspect 27: The method of any of aspects 14 through 26, further comprising: obtaining a feedback message indicating that the UE used the sidelink resources for transmitting the uplink message.

Aspect 28: The method of aspect 27, wherein the feedback message comprises a NACK message or an indication that a sidelink message has been dropped by the UE.

Aspect 29: An apparatus for wireless communications at a UE, comprising a processor; memory coupled with the processor; and instructions stored in the memory and executable by the processor to cause the apparatus to perform a method of any of aspects 1 through 13.

Aspect 30: An apparatus for wireless communications at a UE, comprising at least one means for performing a method of any of aspects 1 through 13.

Aspect 31: A non-transitory computer-readable medium storing code for wireless communications at a UE, the code comprising instructions executable by a processor to perform a method of any of aspects 1 through 13.

Aspect 32: An apparatus for wireless communications at a network entity, comprising a processor; memory coupled with the processor; and instructions stored in the memory and executable by the processor to cause the apparatus to perform a method of any of aspects 14 through 28.

Aspect 33: An apparatus for wireless communications at a network entity, comprising at least one means for performing a method of any of aspects 14 through 28.

Aspect 34: A non-transitory computer-readable medium storing code for wireless communications at a network entity, the code comprising instructions executable by a processor to perform a method of any of aspects 14 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   at least one processor; and
   memory coupled to the at least one processor, the memory storing instructions executable by the at least one processor to cause the apparatus to:
      receive an uplink grant indicating uplink resources on which to transmit uplink signaling;
      receive a sidelink grant indicating sidelink resources on which to transmit sidelink signaling;
      transmit, in a subset of the sidelink resources, uplink control information comprising a plurality of parameters associated with an uplink message; and
      transmit the uplink message via the sidelink resources based at least in part on the uplink control information.

2. The apparatus of claim 1, wherein the instructions are further executable by the at least one processor to cause the apparatus to:
   receive control signaling indicating a priority threshold value associated with a preemption of sidelink resources for uplink communications, wherein the instructions executable by the at least one processor to cause the apparatus to transmit the uplink message are based at least in part on a first priority level associated with the uplink message.

3. The apparatus of claim 2, wherein the instructions are further executable by the at least one processor to cause the apparatus to:
   compare the first priority level with a second priority level associated with a pending sidelink message, wherein the priority threshold value comprises a priority difference threshold value associated with the first priority level and the second priority level, and wherein the instructions executable by the at least one processor to cause the apparatus to transmit the uplink message via the sidelink resources are based at least in part on a difference between the first priority level and the second priority level satisfying the priority threshold value.

4. The apparatus of claim 2, wherein the instructions are further executable by the at least one processor to cause the apparatus to:
   determine that the first priority level satisfies the priority threshold value, wherein the priority threshold value is associated with the first priority level, and wherein the instructions executable by the at least one processor to cause the apparatus to transmit the uplink message via the sidelink resources are based at least in part on the first priority level satisfying the priority threshold value.

5. The apparatus of claim 2, wherein the instructions are further executable by the at least one processor to cause the apparatus to:
   receive control signaling indicating a second priority threshold value associated with retransmission of a sidelink message; and
   determine that a retransmission message associated with the sidelink resources fails to satisfy the second priority threshold value or that the sidelink message associated with the sidelink resources is not a retransmission message, wherein the instructions executable by the at least one processor to cause the apparatus to transmit the uplink message via the sidelink resources are based at least in part on the determining.

6. The apparatus of claim 1, wherein the instructions are further executable by the at least one processor to cause the apparatus to:
   receive control signaling indicating a subset of the sidelink resources that are available for transmission of the uplink message; and
   select the subset of sidelink resources from the sidelink resources, wherein the instructions executable by the at least one processor to cause the apparatus to transmit the uplink message comprises instructions executable by the at least one processor to cause the apparatus to transmit the uplink message via the subset of sidelink resources.

7. The apparatus of claim 1, wherein the plurality of parameters comprises a modulation and coding scheme, a demodulation reference signal, a hybrid automatic request process number, a time domain resource allocation associated with the sidelink resources, a frequency resource allocation associated with the sidelink resources, a number of layers, a pre-coder, a new data indicator, a redundancy version identifier, or any combination thereof.

8. The apparatus of claim 1, wherein the instructions are further executable by the at least one processor to cause the apparatus to:
   receive control signaling indicating one or more of the plurality of parameters, wherein the instructions executable by the at least one processor to cause the apparatus to transmit the uplink control information are based at least in part on control signaling indicating the one or more of the plurality of parameters.

9. The apparatus of claim 1, wherein the instructions are further executable by the at least one processor to cause the apparatus to:
   receive an indication of the subset of the sidelink resources.

10. The apparatus of claim 1, wherein the subset of sidelink resources is associated with a fixed position within the sidelink resources.

11. The apparatus of claim 1, wherein the instructions are further executable by the at least one processor to cause the apparatus to:
- drop a pending sidelink message based at least in part on the instructions executable by the at least one processor to cause the apparatus to transmit the uplink message via the sidelink resources; and
- transmit a feedback message indicating that the UE used the sidelink resources for transmitting the uplink message.

12. The apparatus of claim 11, wherein the feedback message comprises a negative acknowledgement message or an indication that the pending sidelink message has been dropped.

13. An apparatus for wireless communications at a network entity, comprising:
- at least one processor; and
- memory coupled to the at least one processor, the memory storing instructions executable by the at least one processor to cause the apparatus to:
  - output an uplink grant for a user equipment (UE) indicating uplink resources on which the UE is to transmit uplink signaling;
  - output a sidelink grant for the UE indicating sidelink resources on which the UE is to transmit sidelink signaling;
  - obtain, in a subset of the sidelink resources, uplink control information comprising a plurality of parameters associated with an uplink message; and
  - obtain the uplink message via the sidelink resources based at least in part on the uplink control information.

14. The apparatus of claim 13, wherein the instructions are further executable by the at least one processor to cause the apparatus to:
- output control signaling indicating a priority threshold value associated with a preemption of sidelink resources for uplink communications, wherein the instructions executable by the at least one processor to cause the apparatus to obtain the uplink message are based at least in part on a first priority level associated with the uplink message.

15. The apparatus of claim 14, wherein the priority threshold value comprises a priority difference threshold value associated with the first priority level and a second priority level associated with a pending sidelink signaling.

16. The apparatus of claim 14, wherein the priority threshold value is associated with the first priority level.

17. The apparatus of claim 13, wherein the instructions are further executable by the at least one processor to cause the apparatus to:
- output control signaling indicating a subset of the sidelink resources that are available for transmission of the uplink message; and
- monitor the subset of the sidelink resources for the uplink message, wherein the instructions executable by the at least one processor to cause the apparatus to obtain the uplink message via the sidelink resources are based at least in part on the monitoring.

18. The apparatus of claim 17, wherein the subset of the sidelink resources comprises a subset of one or more monitoring occasions for obtaining uplink signaling via the sidelink resources.

19. The apparatus of claim 17, wherein the subset of the sidelink resources partially overlaps with one or more monitoring occasions for obtaining uplink signaling via the sidelink resources.

20. The apparatus of claim 13, wherein the instructions are further executable by the at least one processor to cause the apparatus to:
- output control signaling indicating a third priority level associated with retransmission of a sidelink message.

21. The apparatus of claim 13, wherein the plurality of parameters comprises a modulation and coding scheme, a demodulation reference signal, a hybrid automatic request process number, a time domain resource allocation associated with the sidelink resources, a frequency resource allocation associated with the sidelink resources, a number of layers, a pre-coder, a new data indicator, a redundancy version identifier, or any combination thereof.

22. The apparatus of claim 13, wherein the instructions are further executable by the at least one processor to cause the apparatus to:
- output control signaling indicating one or more of the plurality of parameters, wherein the instructions executable by the at least one processor to cause the apparatus to obtain the uplink control information are based at least in part on the control signaling indicating the one or more of the plurality of parameters.

23. The apparatus of claim 13, wherein the instructions are further executable by the at least one processor to cause the apparatus to:
- output control signaling indicating the subset of the sidelink resources, wherein the instructions executable by the at least one processor to cause the apparatus to obtain the uplink control information are based at least in part on outputting the control signaling indicating the subset of the sidelink resources.

24. The apparatus of claim 13, wherein the subset of sidelink resources is associated with a fixed position within the sidelink resources.

25. The apparatus of claim 13, wherein the instructions are further executable by the at least one processor to cause the apparatus to:
- obtain a feedback message indicating that the UE used the sidelink resources for transmitting the uplink message.

26. The apparatus of claim 25, wherein the feedback message comprises a negative acknowledgement message or an indication that a sidelink message has been dropped by the UE.

27. A method for wireless communications at a user equipment (UE), comprising:
- receiving an uplink grant indicating uplink resources on which to transmit uplink signaling;
- receiving a sidelink grant indicating sidelink resources on which to transmit sidelink signaling;
- transmitting, in a subset of the sidelink resources, uplink control information comprising a plurality of parameters associated with an uplink message; and
- transmitting the uplink message via the sidelink resources based at least in part on the uplink control information.

28. A method for wireless communications at a network entity, comprising:
- outputting an uplink grant for a user equipment (UE) indicating uplink resources on which the UE is to transmit uplink signaling;
- outputting a sidelink grant for the UE indicating sidelink resources on which the UE is to transmit sidelink signaling;
- obtaining, in a subset of the sidelink resources, uplink control information comprising a plurality of parameters associated with an uplink message; and obtaining the uplink message via the sidelink resources based at least in part on the uplink control information.

\* \* \* \* \*